United States Patent [19]

Hagiwara

[11] Patent Number: 4,541,057
[45] Date of Patent: Sep. 10, 1985

[54] SYSTEM FOR PERFORMING COMBINED FINANCIAL TRANSACTIONS WITH SINGLE DISPENSING OF CASH

[75] Inventor: Isamu Hagiwara, Kyoto, Japan

[73] Assignee: Omron Tateisi Electronics Co., Kyoto, Japan

[21] Appl. No.: 368,815

[22] Filed: Apr. 15, 1982

[30] Foreign Application Priority Data

Apr. 16, 1981 [JP] Japan .................................. 56-58309
Apr. 16, 1981 [JP] Japan .................................. 56-58310

[51] Int. Cl.³ ............................................. G06F 15/30
[52] U.S. Cl. ..................................... 364/408; 364/900
[58] Field of Search ................. 364/408, 900; 235/379

[56] References Cited

U.S. PATENT DOCUMENTS 3,487,905  1/1970  James, Sr. ......................... 364/408
4,225,779  9/1980  Sano et al. ......................... 235/379
4,314,352  2/1982  Fought .............................. 364/900

Primary Examiner—David H. Malzahn
Attorney, Agent, or Firm—Stevens, Davis, Miller & Mosher

[57] ABSTRACT

A system for performing a combined transaction service with a cash receiving unit having a cash inlet for accepting the cash inserted into the inlet upon checking the cash, a cash dispenser having a cash outlet for releasing a specified amount of cash to the outlet upon counting up the amount, keys for entering amounts of money for depositing and withdrawing transactions, a key for setting a combined transaction service, a display for showing transaction information, and a payment balance register for storing the amount of money to be paid for each transaction of the combined transaction service. When the system is set for the service, the amount of money accepted by the cash receiving unit and the amount of money to be withdrawn for each transaction is added to the register, and the amount of money to be deposited for each transaction is substracted from the register. When the combined service is set, the unit is prevented from dispensing cash, and when the service is canceled, cash in the sum of the payment balance is dispensed from the dispenser. The system enables one customer to perform depositing and withdrawing transactions on a plurality of accounts by placing in cash or dispensing cash once.

12 Claims, 27 Drawing Figures

FIG.6

| ACCOUNT NO. | 12345 |
|---|---|
| PRINTING LINE | 12 |
| BALANCE | 1,500 |

TSK FLAG

FUNCTION KEY FLAG

| KEYED-IN LINE FLAG | ACCOUNT NO. | 0 |
|---|---|---|
| | PRINTING LINE | 0 |
| | BALANCE | 1 |
| | TRANSACTION AMOUNT | 0 |
| | REMARKS | 0 |
| | ⋮ | |
| | KIND OF MONEY | 0 |
| | DISPENSING (TELLER) | 0 |

| THC(DE) |
|---|
| THC(WD) |

| CRU | FAILURE |
|---|---|
| | BILL EXCESS |
| CD | FAILURE |
| | BILL SCANTY |
| | 2-BILL TRANSPORT |
| | IDLE TRANSPORT |

TOTAL REGISTER

---

TOTAL

TRANSACTION FREQUENCY

SUM OF EACH TRANSACTION

| REGISTERS | TSR |
|---|---|
| | TSWR |
| | AAR |
| | THR |
| | TAR |
| | CHR |
| | WAR |
| | WAWR |
| | PBR |
| | DAR |
| | CAR |
| | RTR |
| | DTR |

RAM (15)

FIG. 18

| | | |
|---|---|---|
| 1ST LINE | OD DEPOSIT WITH BANK BOOK, WD | |
| 2ND | ACCOUNT NO. ( | 1 2 3 4 5 ) PR LINE (12) |
| | | ↘Cu |
| 3RD | BALANCE ( | $1,500) |
| 4TH | AMOUNT OF TRANSACTION ( | $900) |
| 5TH | REMARKS ( | ) IDR ( ) |
| 6TH | AMOUNT ACCEPTED ( | ) |
| 7TH | ACCEPTED BY T ( | ) |
| 8TH | AMOUNT OF CHANGE ( | ) |
| 9TH | AMOUNT OF WITHDRAWAL ( | $900) |
| 10TH | KIND OF MONEY ( | $100×9) |
| 11TH | DISPENSED BY T ( | ) |
| 12th | | |

SYSTEM FOR PERFORMING COMBINED FINANCIAL TRANSACTIONS WITH SINGLE DISPENSING OF CASH

BACKGROUND OF THE INVENTION

The present invention relates to a system for performing transactions, such as depositing and withdrawal, for use in banking business and like financial business.

Transaction performing systems of this type include those to be used by the teller and those to be manipulated by the customer himself, but such systems are all adapted to perform only one transaction of either depositing or withdrawal on one account by a single operating procedure. However, it is often desired to perform at once a plurality of transactions including, for example, withdrawing an amount of cash from one account and depositing part of the cash, or the whole of the cash and some additional amount of money in another account. When such transactions are to be performed with the conventional system, the customer must operate the system for a withdrawal and actually receives cash first and thereafter operate the system again for depositing the cash. Thus the transaction procedure is cumbersome. Accordingly it is desired to provide a system which is adapted to perform a plurality of transactions at one time, enabling one customer to perform depositing and withdrawing transactions on a plurality of accounts by placing in cash once or dispensing cash once. Such a plurality of transactions to be performed in this mode will hereinafter by referred to as a "combined transaction service."

On the other hand, when a depositing transaction is to be executed by a system adapted for use by the teller, the customer usually writes the amount of deposit on a depositing slip and hands cash in the amount of deposit to the teller along with the slip. The teller keys in the amount of deposit (transaction) with reference to the slip and places the cash into the cash inlet. At this time, the teller usually checks whether or not the amount of the cash is equal to the amount of transaction because the amount of the cash can be larger or less than the amount of transaction due to an error of the customer. It is therefore desired to realize a system having an excess rejection mode, such that even when an amount of cash in excess of the amount of transaction is placed into the inlet without being noticed by the teller, the excess of cash will be returned immediately when the system is set for the excess rejection mode. With the excess returned, the teller immediately recognizes the excess. This prevents misdepositing due to the error of the customer or teller, assuring correct transactions and reducing the burden on the teller.

However, when an amount of cash corresponding to the combined amount of deposits for a plurality of transactions is to be deposited completely by placing in the cash once for a combined transaction service, the amount of cash placed in can be in excess of the amount of a single transaction. If the system is set for the excess rejection mode in this case, the excess of cash will be returned immediately, so that the combined transaction service becomes meaningless.

SUMMARY OF THE INVENTION

An object of the present invention is to provide a system for performing combined transaction services which, when cash is to be placed into and withdrawn from a plurality of accounts by one customer, is adapted to execute such transactions by placing in cash once or dispensing cash once.

With such a combined transaction service, the difference between the amount of money received and the amount of money to be delivered is calculated for each of the series of transactions, and the balance payable to the customer, if any, upon completion of the service, is paid to the customer. However, if the payable balance is negative, there arises an objection.

Another object of the invention is to provide a system of the type described above which checks at least the balance to be paid for the depositing transaction included in a series of combined transactions so as to satisfactorily execute the service even when the balance becomes negative.

Another object of the invention is to provide a transaction performing system having an excess rejection mode, such that even if an amount of cash in excess of the amount of transaction is placed into the cash inlet of the system without being noticed by the teller, the excess of cash is returned immediately when the system is set for the excess rejection mode.

Another object of the invention is to a system for performing combined transaction services which has an excess rejection mode and in which the excess rejection mode is automatically cancelled when performing the combined transaction service.

The present invention provides a system for performing combined transaction services which comprises a cash receiving unit having a cash inlet for receiving the cash inserted into the inlet upon checking the cash, a cash dispenser having a cash outlet for releasing a specified amount of cash to the outlet upon counting up the amount, means for entering amounts of money for depositing and withdrawing transactions, a key for setting a combined transaction service, a display for showing transaction information, payment balance memory means for storing the amount of money to be paid for each transaction of the combined transaction service, calculation means for calculating a payment balance when the system is set for the combined transaction service by adding to the memory means the amount of money received by the cash receiving unit and the amount of money to be withdrawn for each transaction and subtracting from the memory means the amount of money to be deposited for each transaction, and cash dispenser control means for preventing the cash dispenser from dispensing cash when the system is set for the combined transaction service and causing the dispenser to release cash in the sum of the payment balance when the combined transaction service is cancelled.

When a customer performs depositing and withdrawing transactions on a plurality of accounts with use of the above system, the customer places in cash once or the system dispenses cash once. Thus the system executes the transactions continuously in a short period of time and is easy to operate by the teller.

The present invention is useful not only for transaction performing systems for the teller but also for automatic cash depositing and dispensing machines for use by customers.

The above system is provided with means for checking whether or not the payment balance is negative at least for depositing transactions. When the balance is negative, a message to that effect is given on the display. With reference to the display, the teller cancels the transaction, keys in an altered amount of transaction, resets the cash or supplements the placed-in cash. This prevents execution of incorrect transactions. Some other measures to be taken when the payment balance is negative will become apparent from the embodiments to be given later.

The above system has means for storing the amount of cash received by the cash receiving unit, means for storing the amounts of transactions entered by the entering means and a key for setting the excess rejection mode. The cash receiving unit has a checker for checking the cash to be delivered to a cash return outlet and the cash placed into the cash inlet. When the excess rejection mode is set, the cash in the inlet is successively checked by the checker to accept genuine bills and coins only. Every time cash is accepted, the amount received is compared with the amount of transaction, and the excess, if any, is retured to the return outlet. Thus the excess rejection mode can be realized by controlling the cash dispenser in this way.

Other features of the invention will become more apparent from the following description of embodiments with reference to the accompanying drawings.

BRIEF DESCRIPTION OF THE DRAWINGS

FIG. 6 shows the contents of a RAM;

FIG. 18 shows an example of display on a CRT;

DESCRIPTION OF THE PREFERRED EMBODIMENTS

Figure 1:
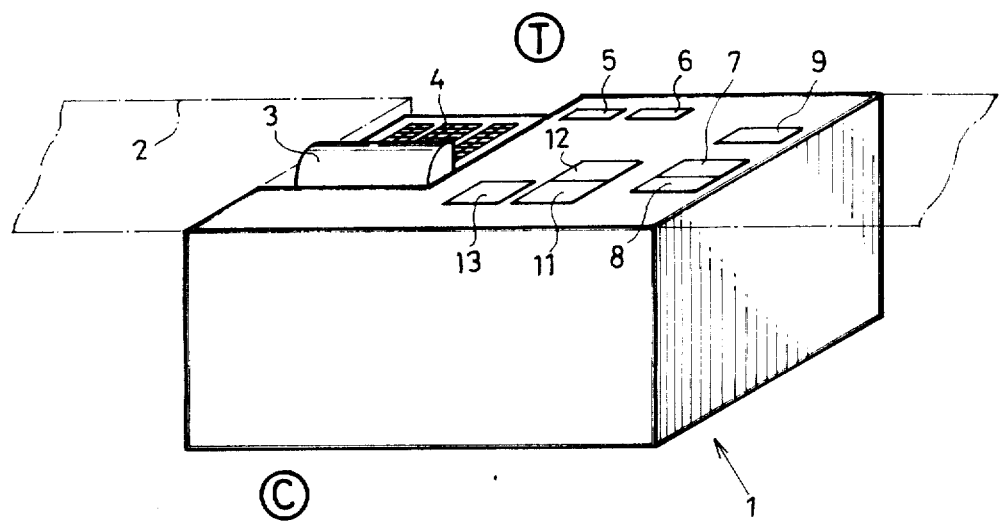
FIG. 1 is a perspective view showing the appearance of a transaction performing system.

FIG. 1 shows a transaction performing system 1 in its entirety. The system is placed on a counter 2 installed on the interior floor of a bank, or in a cutout portion of the counter 2, or on one side of a teller T adjacent the counter 2. A customer C is opposed to the teller T with the system 1 interposed therebetween. The system 1 is used by both persons to execute transactions. The system 1 has a transaction data display 3 for the teller, keyboard 4 for the teller, bank note inlet 5, slip inlet 6, bill inlet 7, bill return outlet 8, bill outlet 9, coin inlet 11, coin return outlet 12 and coin outlet 13. A cathode-ray tube, plasma display or the like is useful for the display 3. In the present embodiment, a cathode-ray tube is used as the display 3, which therefore will be referred to briefly as "CRT".

Figure 2:
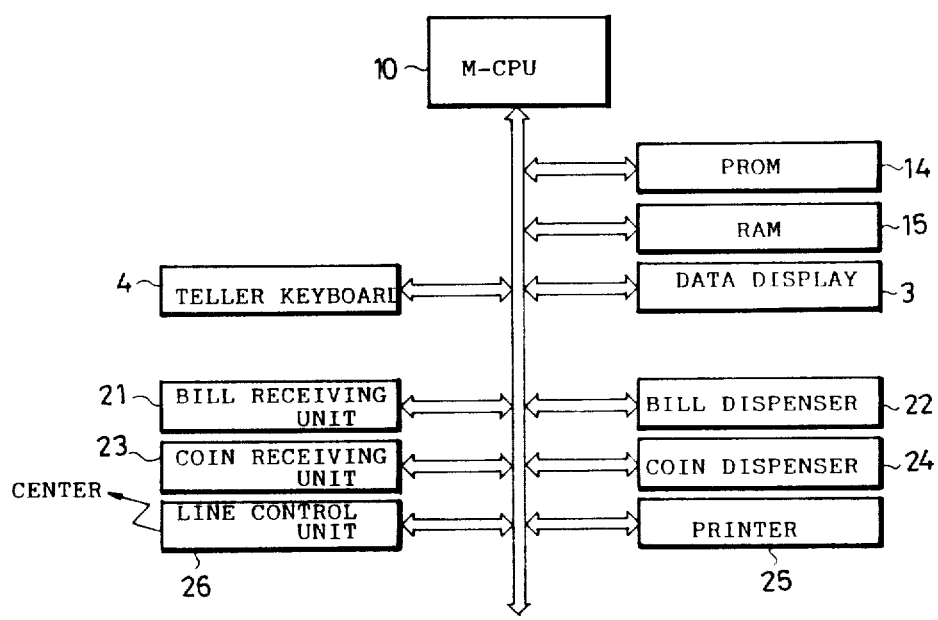
FIG. 2 is a block diagram showing the interior construction of the system.

FIG. 2 schematically shows the interior construction of the system 1. The processing of transactions is controlled by a central processing unit (e.g. microprocessor, hereinafter referred to as "CPU") 10. The CPU 10 has PROM 14 having a control program stored therein, and RAM 15 for storing various items of transaction data. The registers to be described later are also provided in the RAM. The CPU 10 is provided at its input and output devices with the CRT 3, keyboard 4, a bill receiving unit 21, bill dispenser 22, coin receiving unit 23, coin dispenser 24 and printer 25 for bank notes and slips. The system 1 is further provided with a line control unit 26 through which transaction data communication is conducted between the system and the control center. The interface for the input and output devices, control circuit for the CRT 3, etc. are not shown in FIG. 2.

Figure 3:
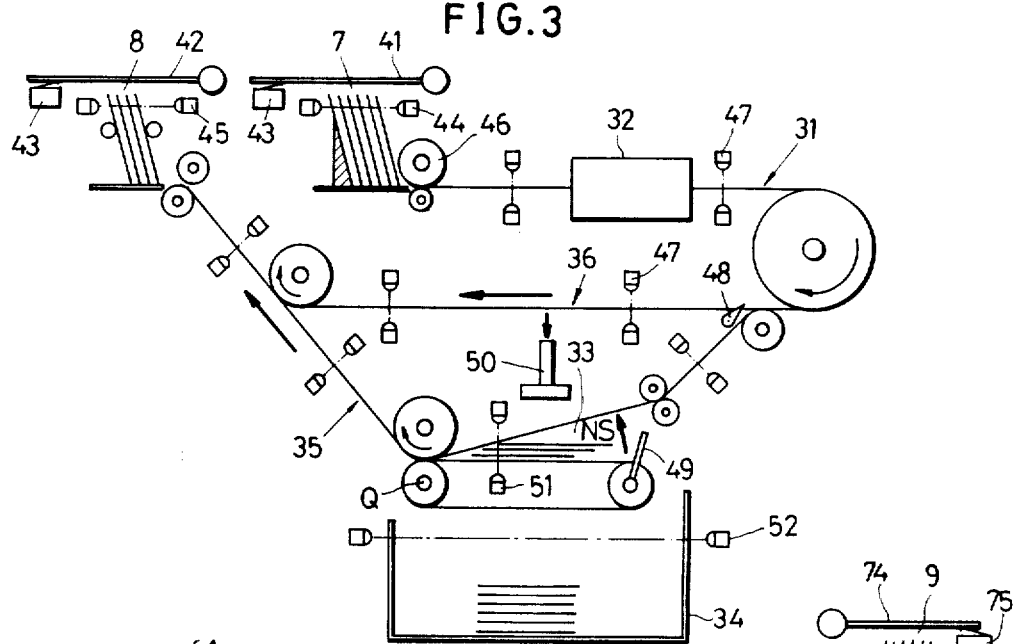
FIG. 3 is a diagram schematically showing the construction of a bill receiving unit.

FIG. 3 schematically shows the bill receiving unit 21. The unit 21 comprises the bill inlet 7, a transport roller 46 for sending out bills from the inlet 7, a path 31 of transport of the bills to a holder 33, a bill checker 32 disposed at an intermediate portion of the path 31 for checking the bills for kind and genuineness, the above-mentioned holder 33 by which the bills discriminated as being genuine by the checker 32 are temporarily held (to be abbreviated later as "TH"), a bill container 34 for receiving the bills from the holder 33, the bill return outlet 8, a first path of return of bills, 35, through which the bills on the holder 33 are returned to the outlet 8 when the transaction is nullified, and a second path of return of bills, 36, through which the bills which are not discriminated as being genuine by the checker 32 are returned. The inlet 7 is provided with a shutter 41, a detector 43 for detecting the state of the shutter 41 and a bill detector 44. The return outlet 8 is provided with a shutter 42, a detector 43 for detecting the state of the shutter 42 and a detector 45 for detecting removal of bills. The shutters 41 and 42 are opened and closed automatically and are also closable manually. Each of the paths 31, 35 and 36 is provided by belts for nipping the opposite sides of the bill along its length and is provided at suitable locations with detectors 47 for detecting the passage of the bill. The belts are reeved around a large number of pulleys. Jamming of bills can be detected by checking, with use of a timer or the like, the time taken for the bill to travel from one detector 47 to the next detector 47. A path switch 48 is provided at the location where the second path 36 branches from the transport path 31. The second path 36 is connected to an intermediate portion of the first path 35. The temporary holder 33 is disposed below the transport path 31 and retains bills on belts reeved around pulleys. It is provided with an arm 49 for preventing the bills from falling off. To return the temporarily held bills, the belts move about a point Q to hold the bills between the belts of the transport path 31 and these belts, whereby the bills are sent out. The holder 33 further has a depressing member 50, by which the bills supported at their opposite sides on the belts are pushed on the center portion to fall into the container 34, and a detector 51 for detecting the held bills. The maximum number of bills (NS) that can be held by the holder is predetermined and is, for example, fifty. The bill container 34 is provided with a detector 52 for detecting that the quantity of bills in the container 34 has become excessively large. According to the arrangement shown in FIG. 3, all kinds of bills are retained in the holder 33 and then placed into the container. However, it is desirable to provide a temporary holder and a container for each kind of bills. Further when desired, a bill inlet and other means may be provided for each kind of bills.

Figure 4:
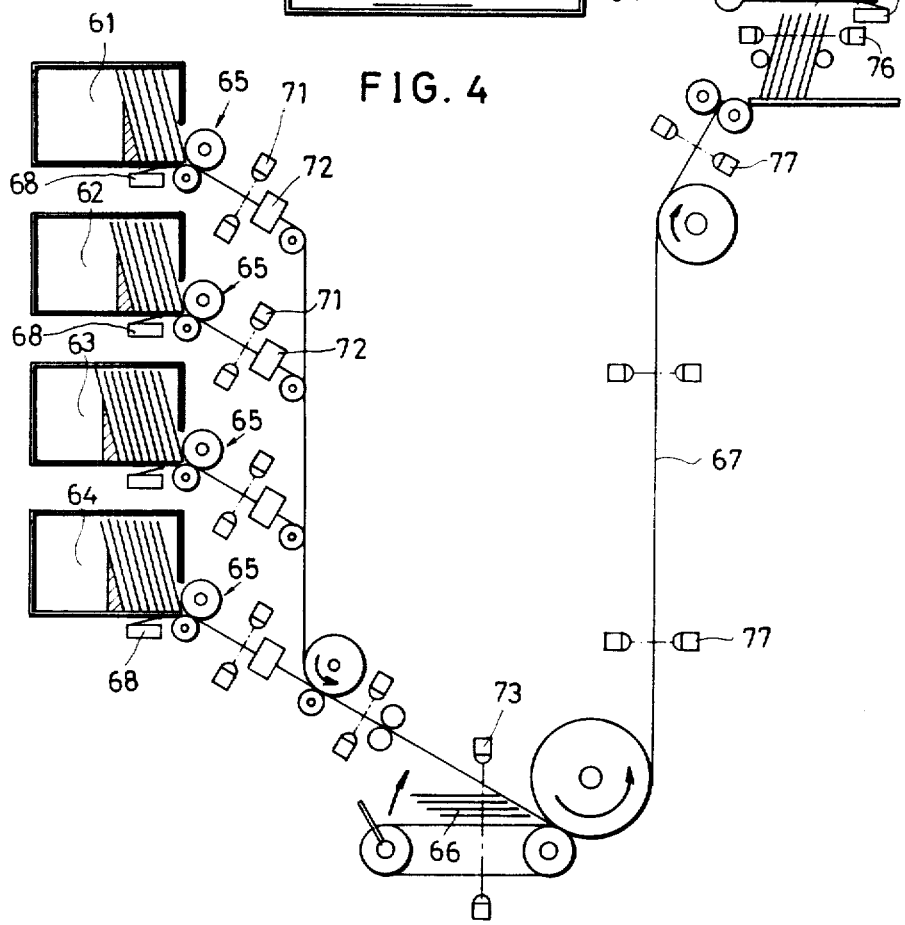
FIG. 4 schematically shows the construction of a bill dispenser.

FIG. 4 schematically shows the bill dispenser 22, which comprises containers 61 to 64 for containing a large number of each kind of bills to be dispensed, dispensing means 65 for sending out a specified number of bills from each container, a holder 66 for temporarily holding the bills, the aforementioned bill outlet 9, and a path of discharge of bills, 67, for delivering the temporarily held bills to the outlet 9. Each container has a scarcity detector 68 for detecting that the amount of bills remaining in the container is small. The dispensing means 65 has an idle transport detector 71 for detecting that no bill has been sent out and a two-bill detector 72 for detecting that at least two bills have been sent out simultaneously. The holder 66, which has substantially the same construction as the holder 33 shown in FIG. 3, has a bill detector 73. The outlet 9 has a shutter 74, a detector 75 for detecting the state of the shutter and a bill removal detector 76. The bill dispenser 22 is also provided, at suitable portions of the path of transport of bills, with bill passage detectors 77 for detecting jams. In construction, the coin receiving unit 23 is similar to the bill receiving unit 21, and the coin dispenser 24 to the bill dispenser 22, so that these components will not be described and are not illustrated.

Figure 5:
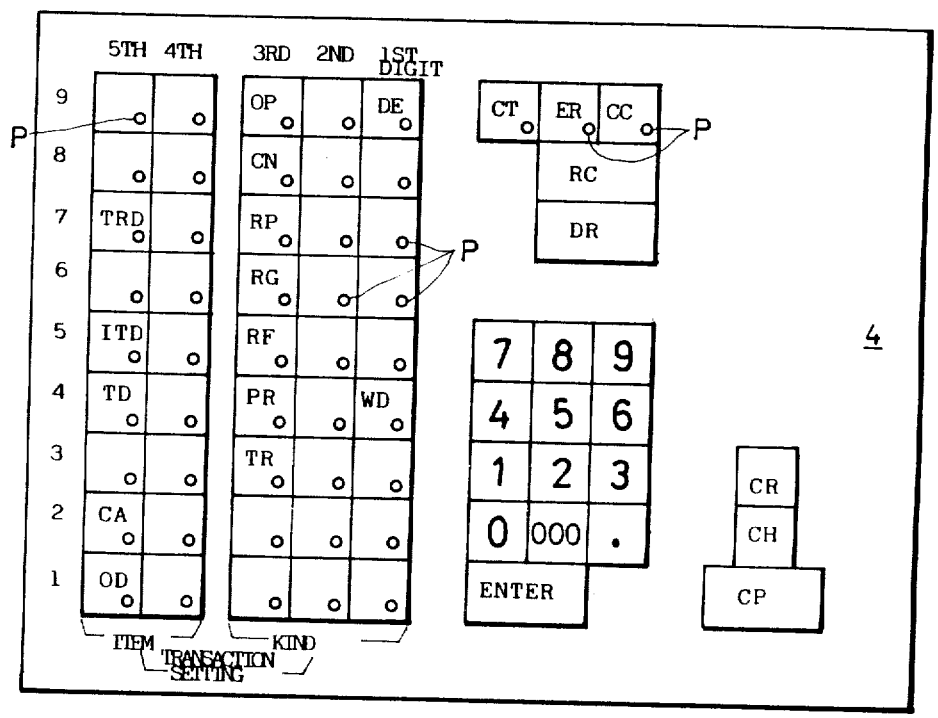
FIG. 5 is a plan view showing a keyboard.

FIG. 5 shows the keyboard 4. The left half of the keyboard 4 provides transaction setting keys including transaction item keys arranged in two columns and transaction kind keys arranged in three columns. The transaction items include tax reserve deposit (TRD), incremental time deposit (ITD), time deposit (TD), current (checking) account (CA), ordinary deposit (OD), etc. The transaction kinds include opening (OP) of a new account as to an item for a customer who already has his account for another item, cancellation (CN), report (RP) for example of change of address, registration (RG) for a new customer, reference (RF) such as balance reference, printing (PR) on bank book, transfer (TR) of account from one branch to another, depositing (DE), withdrawal (WD), etc. These five columns are used for the first to fifth digit positions from right column to left. Each of the columns includes nine keys having code numbers of 1 to 9 from the lowest key upward. Only one of the nine keys is depressed in each column to set a transaction, which is therefore represented by a five-digit number. If none of the nine keys are depressed in a particular column, 0 is given as the number in that column. Each of the transaction setting keys is provided with a pilot lamp P, which goes on upon depression of the key and goes off upon completion of the tranaction or when another key of the same column is depressed.

The right half of the keyboard 4 provides number keys and functional keys including those for combined transaction service (CT), excess rejection (ER), cash counting (CC), recognition (RC), display request (DR), cash return (CR), change (CH) and completion (CP). In addition to the number keys for 0 to 9, the number keys include 000 key for entering 1000's, point key and enter key. The CT, ER and CC keys are each provided with a pilot lamp P, which goes on when the key is depressed and goes off when the key is depressed again. Redepression of a lighted key means resetting of the function set by the key. Some of the functional keys will be described below.

COMBINED TRANSACTION SERVICE KEY (CTK)

This key is used for conducting a plurality of transactions with cash placed in or dispensed once. While this key is on, all the cash placed into the cash receiving units is accepted except for improper bills or coins but the cash to be paid is not dispensed. For a withdrawing transaction, the amount to be delivered or withdrawn is added to the payment balance R (PBR) to be described later. For a depositing transaction, the amount of money to be deposited is subtracted from the PBR. Upon resetting of the CTK, cash in the amount of the payment balance is released from the cash dispenser.

EXCESS REJECTION KEY (ERK)

When an amount of cash in excess of the amount to be deposited is placed into the cash receiving unit for a depositing transaction, this key functions to return the excess of cash. While the ERK is depressed, the cash placed in is checked and counted after the amount of transaction has been keyed in. When the amount of cash found to be genuine does not exceed the amount of transaction, the cash is temporarily held. The excess, if any, is returned.

When the ERK is depressed with the CTK in its depressed position, all the cash discriminated as being genuine is temporarily held, and improper bills or coins only are returned.

CASH COUNTING KEY (CCK)

This key limits the functions of the cash receiving unit to checking and counting only of cash. While the CCK is depressed, the cash placed into the inlet of the unit is checked and counted up. The cash which is genuine is returned to the return outlet by way of the second path of return, and improper money only is held temporarily. The total amount of the cash found to be genuine is displayed. After the genuine cash is removed, the temporarily held faulty money is returned.

The transaction setting key will be referred to as "TSK". The functional key will be represented by the letter "K" as appended to the abbreviation representing the function of the key concerned, as will be apparent from the above.

FIG. 6 shows the contents of the RAM 15, including an area for storing keyed-in account number, line of bank book to be printed on and balance, areas for use as a flag for storing the TSK depressed an area for use as a flag for storing the function key depressed, an area for storing the line (position of cursor) to be given the next input among the second to eleventh lines on the CRT (3) display to be described later ("1" is the cursor position), areas for use as counters (THC) for counting the numbers of bills stored in the holders 33 and 66 of the cash receiving unit (CRU) 21 and cash dispenser (CD) 22, areas for storing the states of the CRU 21 and CD 22, an area for storing the total of the cash discriminated as being genuine when a cash counting mode is set, a totaling area, and an area for use as a group of registers. The group of register includes the following, in which "R" is an abbreviation of register, and "WR" represents a work register for executing the procedure concerned again.

TRANSACTION SETTING REGISTER (TSR)

This register stores the transaction keyed in with transaction setting keys. When the display request key (DRK) is depressed, the keyed-in transaction is set in the register.

TRANSACTION SETTING WR (TSWR)

This register also stores the transaction keyed in by the TSK's. Every time a transaction is thus keyed in, the transaction is set in this register.

ACCEPTED AMOUNT R (AAR)

The amount of money accepted from the customer is stored in this register. Every time cash is checked by the CRU, the amount of genuine money is added to the AAR. The contents of the register are cleared after communication with the center.

TEMPORARILY HELD AMOUNT R (THAR)

This register stores the amount of cash temporarily held after checking by the cash receiving unit and is cleared when the cash is placed into the cash container or returned.

TRANSACTION AMOUNT R (TAR)

The register stores the amounts of depositing and withdrawing transactions. When the transaction amounts are keyed in by the teller, the amounts are set in the register. The register is cleared after communication with the center.

CHANGE R (CHR)

The register stores the amount of change resulting from a depositing transaction. Upon depression of the change key (CHK), the amount of change is calculated and set in the register.

WITHDRAWAL AMOUNT R (WAR)

The register stores the amount of money payable to the customer. After communication with the center, the amount of change (CHA) resulting from a depositing transaction, the amount of a withdrawal transaction, etc. are automatically set in the register. For a cancellation transaction, keyed-in input data is set in the register.

WITHDRAWAL AMOUNT WR (WAWR)

This is a work register for accurately calculating the payment balance.

PAYMENT BALANCE R (PBR)

The register stores the result of addition or subtraction of the amount of each transaction included in a combined transaction service. On completion of the service, the amount of money stored in this register is payed to the customer.

DISPENSING AMOUNT R (DAR)

The amount of money to be dispensed from the cash dispenser is stored in this register.

COUNTED AMOUNT R (CAR)

The amount of money counted by the cash dispensing unit is stored in this register. When the amount to be dispensed is in excess of the amount countable (dispensable) at one time, the amount of money to be counted for one dispensing action is set in the register.

RECEIPT TOTALING R (RTR)

The register is used for totaling the amounts of money normally received by the cash receiving unit.

DISPENSED AMOUNT TOTALING R (DTR)

The register is used for totaling the amounts of money normally dispensed from the cash dispenser.

FIGS. 7 to 16 show processes for performing transactions by the present system. These processes will be described below with reference to an exemplary case of combined transaction service in which a customer draws $900 from an ordinary deposit, then cancels a $100 time deposit (with $10 interest) and further deposits $1100 in a current account. In this case, the amount of money due to the customer is $900+$100+$10=$1010, and the amount of money to be deposited is $1100, so that the customer must place $90 into his account. It is now assumed that the customer hands a $100 bill or a combination of bills (over $10) to the teller and receives $10 as change upon completion of the service. FIG. 17 shows the contents of the registers concerned in corresponding relation to the steps of procedure to be followed by the teller and processing steps. Bills may be placed in or withdrawn by the customer.

For the above three transactions, the customer writes his account number, name and the amount of money to be deposited or the amount of money to be paid on each of a depositing slip and withdrawing slips, and impresses a seal or writes down his signature on the slip. He hands these slips, bank books and $100 cash to the teller, who checks the impressions or signatures on the slips with reference to those on the bank books and then executes the transactions in the following manner.

Figure 7A:
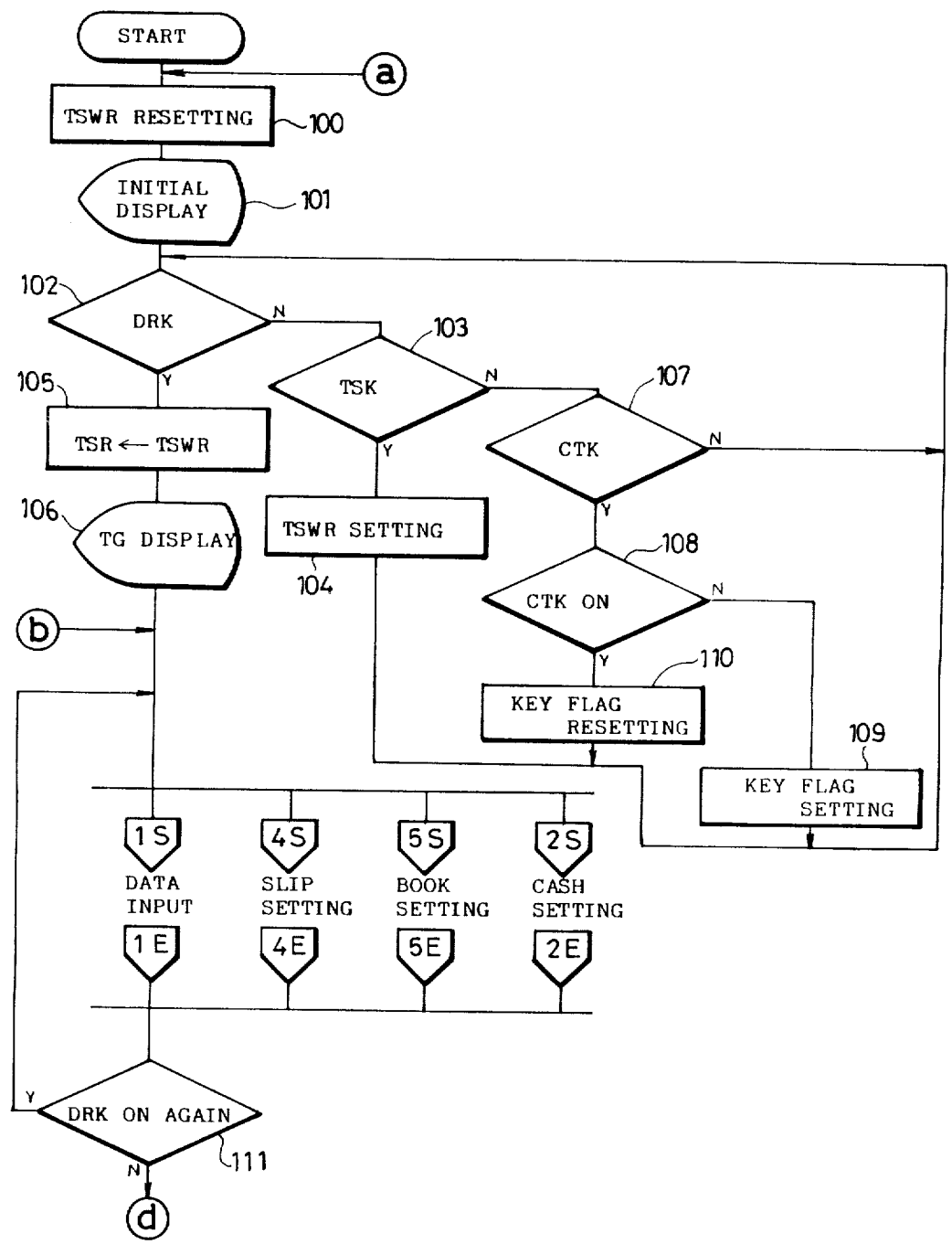
FIGS. 7a and 7b are a flow chart showing an overall process for performing transactions.
Figure 7B:
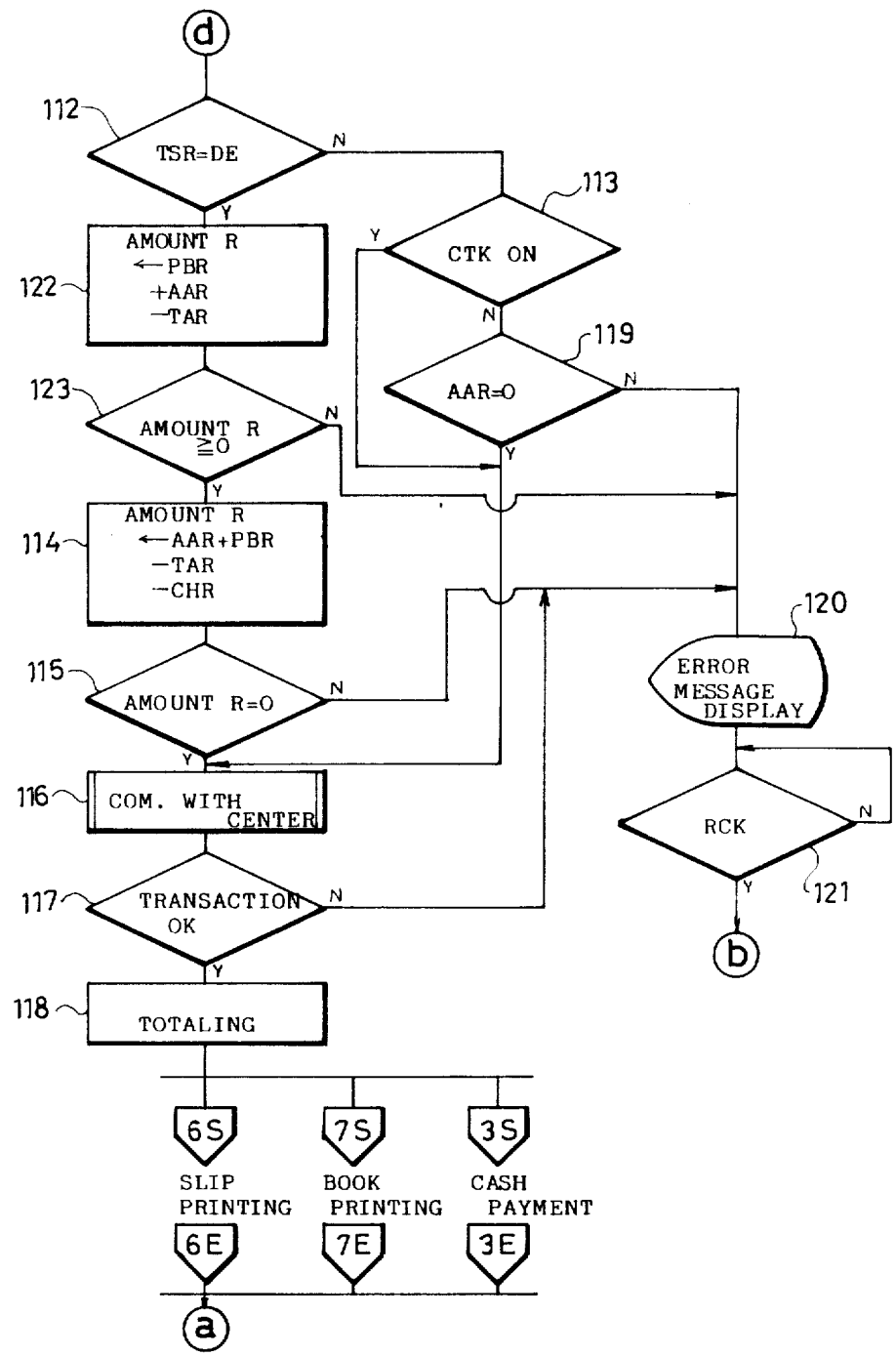

With reference to FIG. 7, the transaction setting WR is reset (step 100) to present an initial display on the CRT 3 (step 101). In the present case, the display is blank. The reset WR means that the data thereof is 00000. The state of reset TSWR is not shown in FIG. 17. Since the teller first depresses the combined transaction service key (CTK), steps 102 and 103 are NO, and step 107 becomes YES. Since the key is not on previously, step 108 proves NO, followed by step 109 in which the CTK flag in the function key flag storage area of the RAM 15. When the CTK is depressed again, step 108 changes to YES to reset the CTK flag as will be described later. Exactly the same steps are taken for the excess rejection and cash counting keys as the setting and resetting of the CTK shown as steps 107 to 110 in FIG. 7.

Next the teller depresses "ordinary" and "withdrawal" keys to set this transaction, so that step 102 is NO, and step 103 is YES. The former key, i.e. OD key, is in the fifth digit position with the code number of 1, and the latter key, i.e. WD key, is in the first digit position and has the code number of 4, so that the set transaction is represented by the number 10004. This number is set in the TSWR (step 104). Subsequently the teller depresses the display request key, turning step 102 to YES to transfer the data from the TSWR to TSR (step 105). Transaction guidance (TG) is displayed on the CRT 3.

FIG. 18 shows an example of transaction guidance. The first line is an identification of the set transaction. The second to eleventh lines are used for showing various items of transaction data. Step 106 shows only the letters indicating such items, e.g. account number, line of the bank book to be printed on (or the last printed line) as shown in the second line, etc. and brackets indicating the locations where the data is to be presented. The data has not been on display. A cursor CU is given at an inside right lower portion of the brackets for the item to be keyed in next. Every item an item is keyed in, the cursor CU shifts to the location of the item to be subsequently entered. The 12th line is used for giving a message.

With reference to the display, the teller keys in the data to be described later, sets the slip and bank book in the inlets 6, 5 and sets cash in place. (Since the first transaction is withdrawal, there is no need to set cash.) These steps can be taken in any order. Finally the completion key is depressed. When these procedures are completed and the display request key is not depressed again (step 111), step 112 follows. The DRK is used for giving an input for cancelling the keyed-in data or for resetting the procedures as will be apparent from the description given later. Accordingly if the DRK is on (YES for step 111), the procedures are redone. The flag for storing redepression of DRK is provided within the RAM 15 as already stated. Step 111 checks the contents of this flag.

Step 112 checks whether or not the present transaction is depositing with reference to the data in the TSR. If it is depositing, whether the payment balance is negative or not is checked in steps 122, 123. Steps 114, 115 further perform zero proof check, followed by communication with the center (step 116). Unless the transaction is depositing, CTK is checked as to whether or not it is already on (step 113). Since the key has already been depressed in the present case, step 113 is YES, followed by communication with the center. When step 113 is NO, AAR is checked as to whether or not the contents thereof are 0 or not (step 119). When the contents are 0, communication with the center is conducted. If otherwise, this means an error. Since the amount of money accepted by the cash receiving unit is stored in AAR, it is generally unlikely that the contents of the AAR for a depositing transaction are not 0. When the depositing transaction is to be cancelled after cash has been accepted by the cash receiving unit with the system set for depositing, there is a need for the teller to depress the DRK for reexecuting the step and to depress the CR key for the return of the cash. When the cash is returned (FIG. 9, step 177), the amount of returned cash is subtracted from the data in the AAR (this step not shown) to change the contents of the AAR to 0. However, if the teller forgets to execute the return step, the data in the AAR does not change to 0. Step 119 indicates an error, which is recognized by the teller.

The control center is provided with a customer information file having recorded therein the account number, name, balance, etc. for each customer. In response to a message given by the system and containing transaction data, the center retrieves the file concerned to check for the presence of the account and other items and determine whether or not a particular transaction is acceptable, for example, by checking if the amount of withdrawal requested is not in excess of the balance. The result is delivered to the system.

If the present transaction is allowable (YES for step 117), the frequency of transactions, the sum of each transaction, etc. are totaled in the RAM 15 (step 118). A certification (e.g. date of transaction, account number, etc.) is printed on the slip, the transaction data is printed on the bank book, and cash is paid. If the transaction is not a combined service, the teller files the printed slip and hands the book and cash to the customer to complete the transaction. When the transaction is not allowable (NO for step 117), or if step 119 reveals an error, an error message is given on the CRT 3 (step 120). Upon depression of the recognition key (step 121), step 106 follows to reexecute a data keying-in procedure, etc. Step 100 may alternatively follow step 121.

Since the present case is a combined transaction service, cash is not actually dispensed in the cash payment process as will be described later.

Figure 8:
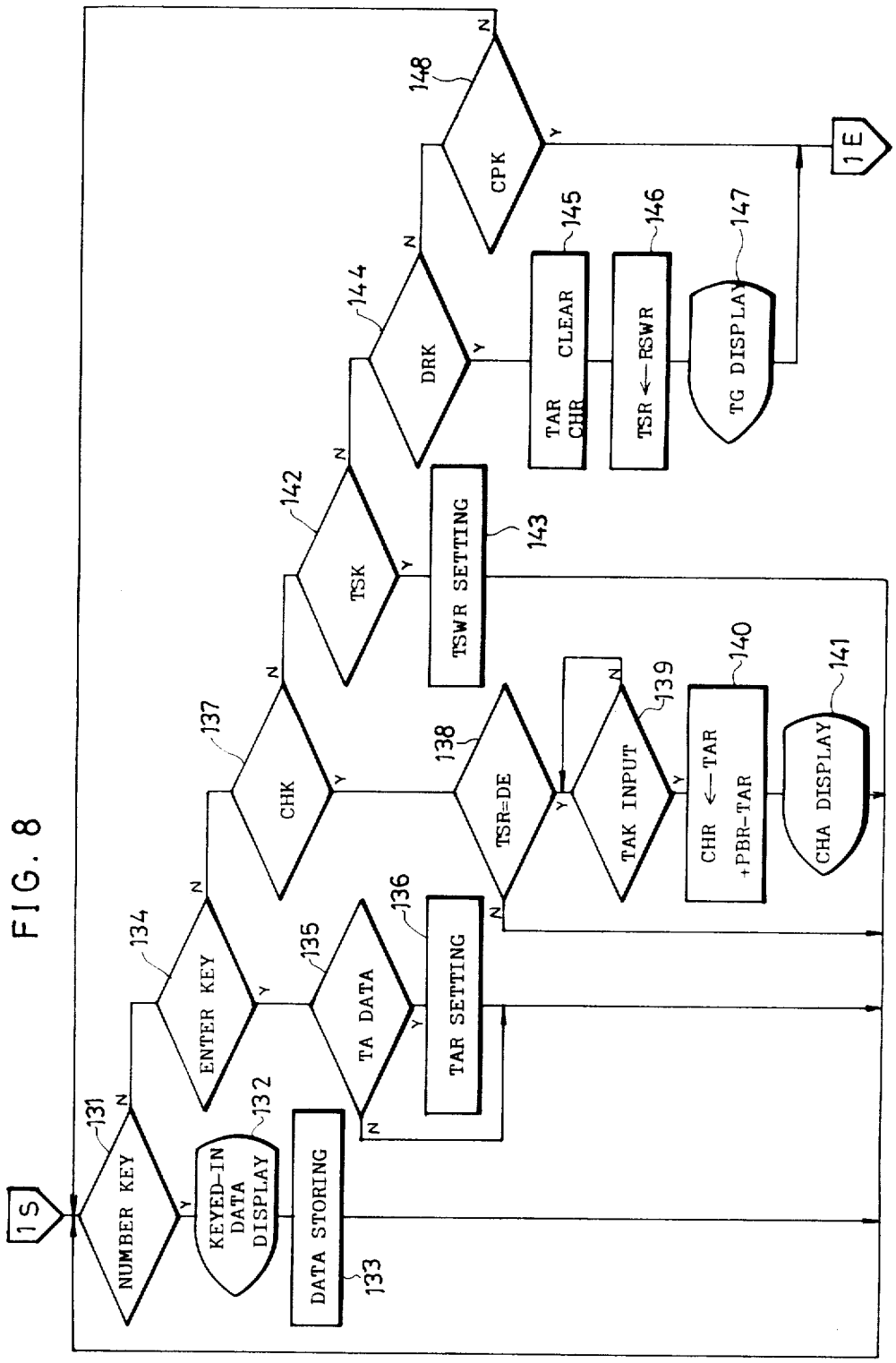
FIG. 8 is a flow chart showing the procedure of data key input processing.

FIG. 8 shows in detail the process for entering data with keys. After the guidance display is presented in step 106, the teller manipulates keys to enter the account number, bank book printing line and balance. With reference to FIG. 8, the cursor CU on the CRT display indicates the blank for the account number. The teller therefore keys in the account number first (step 131), whereupon the number is shown in the brackets (step 132) and is also stored in the RAM 15 (step 133). With the cursor CU shifted to the blank for the book printing line, the teller similarly keys in the line. The balance is subsequently keyed in. These items of data are given on the CRT (see FIG. 18) and stored in the RAM 15 steps 131 to 133 repeated). In the case where such data is recorded in a magnetic stripe affixed to the cover of the bank book, a magnetic stripe reader is provided inside the bank book inlet 5, and the data can be read by the reader and displayed on the CRT 3.

The cursor CU is now positioned in the blank for the amount of transaction in the fourth line. In the present example, the amount of the first transaction is $900 (withdrawal). The teller therefore enters $900 with number keys (step 131), whereupon this amount of transaction is given in the fourth line of the CRT 3 (step 132, see FIG. 18). Step 133 is omitted in the case of the transaction amount. Subsequently the teller depresses the enter key (step 134), whereby the keyed-in transaction amount is set in the TAR (steps 135, 136).

With the amount of transaction keyed in, the cursor CU on the CRT display is positioned in the blank for remarks in the fifth line. If there is no need to enter data for remarks and the initial date of reckoning (IDR), the teller depresses the enter key to skip the line. In the absence of IDR data input, the date on which the transaction is conducted is applied to the transaction. Withdrawal transactions are irrelevant to "AMOUNT ACCEPTED" in sixth line, "ACCEPTED BY T" in seventh line and "AMOUNT OF CHANGE" in eighth line. The cursor CU shifts to the blank for the amount of withdrawal in the ninth line. The terms "ACCEPTED BY T" and "DISPENSED BY T" refer to the amount of cash accepted and the amount dispensed directly by the teller with use of his cash container without using the cash receiving unit or cash dispenser. In this case, the amount accepted by the teller or the amount dispensed by the teller is keyed in, whereupon the amount is given in the seventh or eleventh line on the CRT 3.

The change key (CHK), although not used for withdrawing transactions, will be described briefly. Upon depression of the CHK (step 137) when the transaction concerned is depositing (step 138) and the amount of transaction (TA) has already been entered (step 139), the change is calculated based on the TA (step 140), showing the amount of change (CHA) in the eighth line of the CRT display 3 (step 141).

During a data keying-in procedure, TS keys may be used to set a different kind of transaction for a change in the course of the procedure. When the changed transaction is set (YES for step 142), the set transaction is registered in the TSWR (step 143).

When data input is redone and after the transaction is set again, the display request key (DRK) is depressed (step 144). The depression of the key is stored in the flag of the RAM 15, and the TAR and CHR are cleared (step 145). The data in the TSWR is transferred to the TSR (step 146), and transaction guidance (TG) is displayed on the CRT 3 (step 147). After the above process, step 111 is YES, so that at least data entering procedures are repeated. Steps 142 to 147 are substantially similar to the foregoing steps 102 to 106.

The completion key (CPK) is pushed when all the procedures, i.e. data keying-in and setting of slip, bank book and cash, are completed (step 148).

Figure 11A:
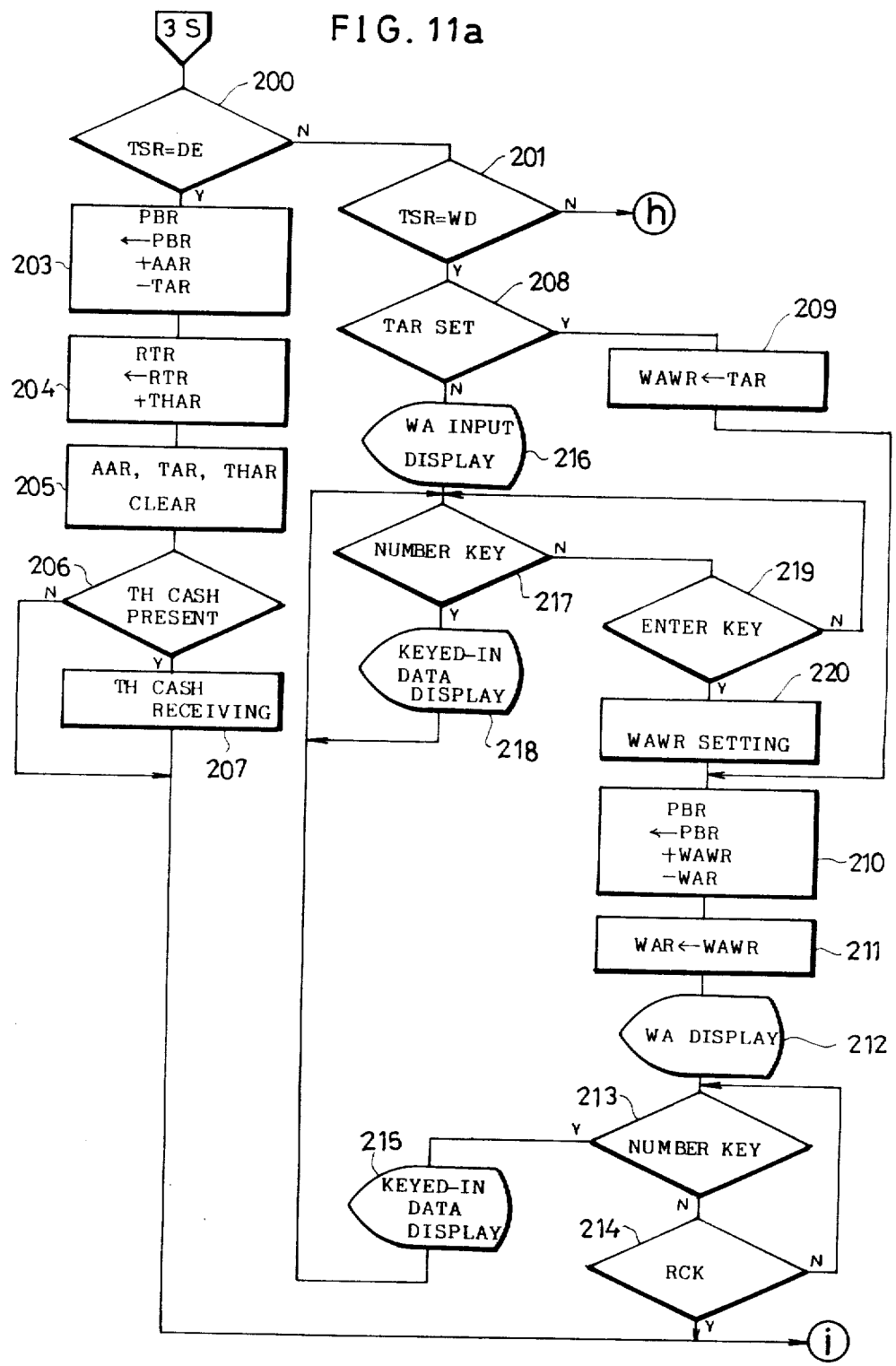
FIGS. 11a and 11b are a flow chart showing a cash payment process.
Figure 11B:
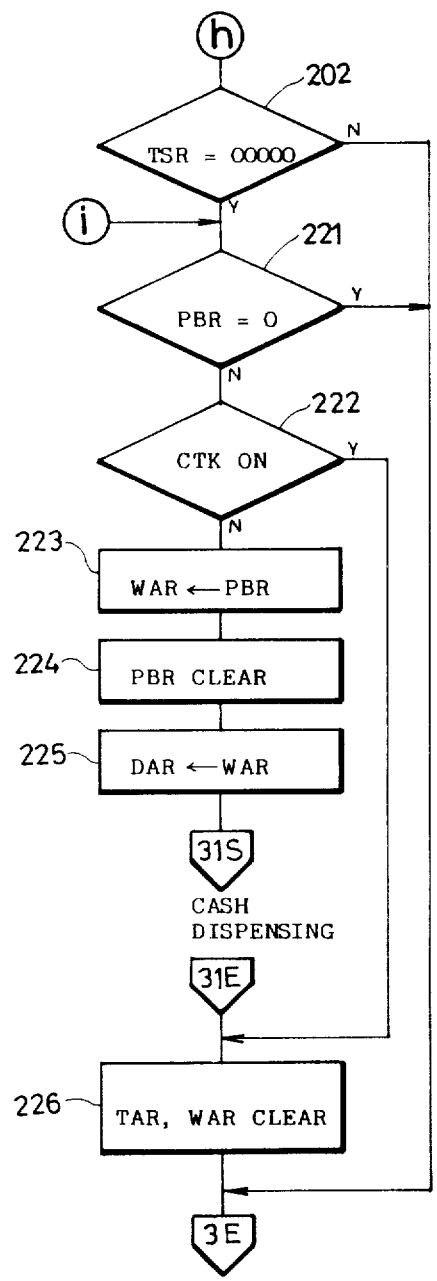

The data keying-in process has been described. Since the slip and bank book setting processes are not very important, these processes will be described finally. Setting of cash is not included in the first transaction which is a withdrawal. When step 111 proves NO with the completion of the procedures following step 106 in FIG. 7, communication with the center (step 116) follows by way of steps 112, 113. If the transaction is allowable (step 117), the slip and bank book are printed, and the payment of cash is made after step 118. The printing process will be described later. FIG. 11 shows the cash payment process.

With reference to FIG. 11, when the data in the TSR is for a withdrawal (NO for step 200, and YES for step 201) and the TAR already set (YES for step 208), the data is transferred from the TAR to the WAWR (step 209). Subsequently the data of the WAWR is added to the data in the PBR, and the data in the WAR is further subtracted, whereby the payment balance is calculated (step 210). Since the TA in the present case is $900, the data of the WAWR is $900, and the data of the PBR and that of the WAR are both 0. The payment balance is therefore $900. The WAR data is subtracted in step 210 for the correction of the amount of withdrawal (WA) to be described later. The WAWR data is thereafter transferred to the WAR (step 211), permitting the CRT 3 to show that the WA is $900 (ninth line) and that the money is nine $100 bills (line 10). This is step 212 (see FIG. 18). With reference to the display, the teller depresses the recognition key (NO for step 213, YES for step 214), and the PBR is checked whether or not its data is 0 (step 221). Because the data is $900, step 221 is NO. The CT key is then checked as to whether or not it has already been depressed (step 222). Since the key is already on, step 222 is YES. The process skips to step 226 without cash dispensing, in which TAR and WAR are cleared. Thus, when the CTK is on, no cash is dispensed even if there is an amount of money to be paid. If the PBR data is 0 (YES for step 221), the amount of money payable is 0, so that no cash is naturally dispensed. The cash dispensing process will be described later.

If an incorrect WA is displayed in step 212, the teller corrects the amount with use of number keys. If necessary, the kind of money can also be corrected. The kind of money displayed on the CRT 3 is such that a minimum number of bills will be dispensed. When the customer desires that $100 included in $900 be dispensed on exchange, the desired kind of money can be specified in step 213 although this step is not directly relevant to the present case of service. The key for specifying the kind of money is not shown on the keyboard 4. For the correction of WA, the correct amount of withdrawal is keyed in with number keys (step 213), whereupon the keyed-in data is displayed on the CRT 3 (step 215). Subsequently the enter key is depressed (step 219), whereby the correct WA is set in the WAWR (step 220). When the WA is thus corrected, the payment balance (PB) is calculated in step 210 again. At this time, the incorrect WA already transferred to the WAR (step 211) is subtracted to calculate the correct PB.

In this way, the first transaction of the combined transaction service, i.e. withdrawal of $900 from an ordinary deposit account, is completed.

Next, the teller proceeds to the cancellation of a time deposit, with the CTK held depressed. First, the teller sets the system for this transaction (FIG. 7, step 103), and depresses the DRK (step 102), whereby the number representing the transaction setting is set in the TSWR (step 104). The data is transferred to the TSR (step 105). Since the time deposit key is in the fifth digit position with a code number of 4, the cancellation key is in the third digit position with a code number of 8, and the withdrawing key is in the first digit position with a code number of 4, the number representing the set transaction is 40804.

The teller then keys in the data and sets the slip and the bank book. In the data keying-in process (FIG. 8), the teller enters the account number and the line of the bank book to be printed on, so that these items of data are shown on the CRT 3. There is no need to key in the balance and the amount of transaction since the present transaction is cancellation. The depression of the completion key is followed by the communication of step 116 by way of steps 111, 112, 113 in FIG. 7. When the transaction is allowed by the communication (step 117), step 118 is executed for transaction totaling. The process proceeds to slip and bank book printing and cash payment.

In the cash payment process (FIG. 11), the process proceeds to steps 200, 201 and then to step 208. Since the TA has not been set, step 208 is NO. In the case of cancellation, the center informs of the cancellation amount including interest, and this is displayed on the CRT 3. In the present case, the cancellation amount is $100 time deposite plus $10 interest and is therefore $110. Further a message is given on CRT 3, line 12, instructing the teller to key in the amount to be withdrawn (step 216). The teller keys in the cancelled amount ($110) as this amount (step 217). The input is displayed on the CRT 3 (step 218). Upon depression of the enter key (step 219), the amount (WA) is set in the WR (step 220).

The cancellation amount data, delivered from the center, may be given directly to the WAWR without resorting to the procedure of keying in by the teller. If the interest is not calculated by the center, the teller will manually calculate the interest and key in the cancellation amount including the interest. As another case in which the data of a transaction amount is delivered from the center, the center calculates a money order handling fee for an amount of money received and transmits the data.

Subsequently the WAWR data, i.e. $110, is added to the PBR data, i.e. $900 (WAR data, 0), to obtain a new payment balance, i.e. $1010, which is stored in the PBR (step 210). The WAWR data is transferred to the WAR (step 211) to display the WA for recognition (step 212). Upon depression of the RC key (step 214), step 226 follows by way of steps 221, 222 to clear the WAR and TAR of the data.

Thus the time deposit cancellation process is completed.

The teller now proceeds to the process for depositing $1100 in the current account. Since this is the last of a series of transactions of combined service, the teller depresses the CTK again (FIG. 7, step 107) to cancel the combined transaction service function (step 110). The teller then sets the transaction and depresses the DRK (step 103, 102). Since the CA key is in the fifth digit position with a code number of 2 and the DE key is in the first position with a code number of 9, the transaction setting is represented by 20009.

Subsequently, the teller proceeds to key in the data and set the slip, bank book and cash. For the data keying-in process (FIG. 8), the teller keys in the account number, bank book printing line, balance and amount of transaction ($1100). These items of data are displayed in the second to fourth lines of the CRT 3, while the TA input is set in the TAR (steps 131 to 136). The CH key is also depressed in the data keying-in process. This procedure will be described later.

Figure 9A:
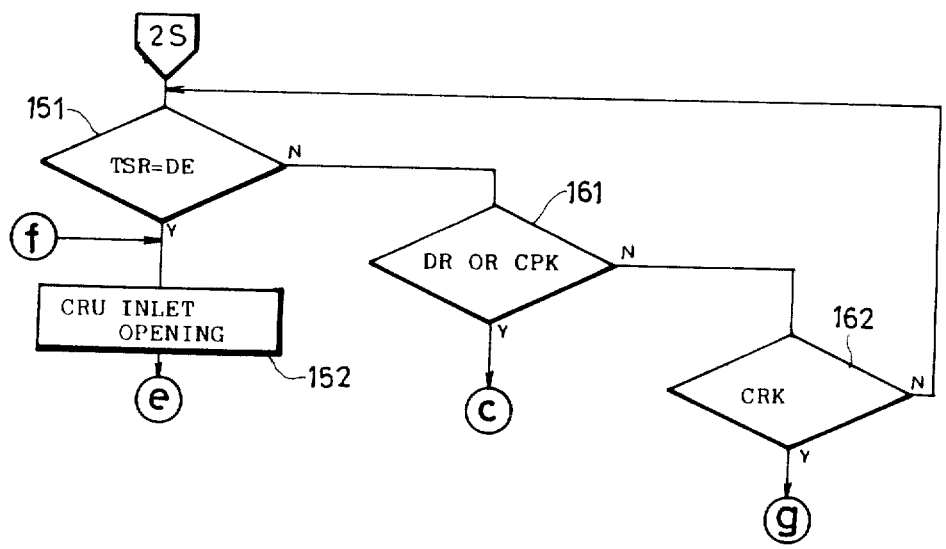
FIGS. 9a and 9b are a flow chart showing a cash setting process.
Figure 9B:
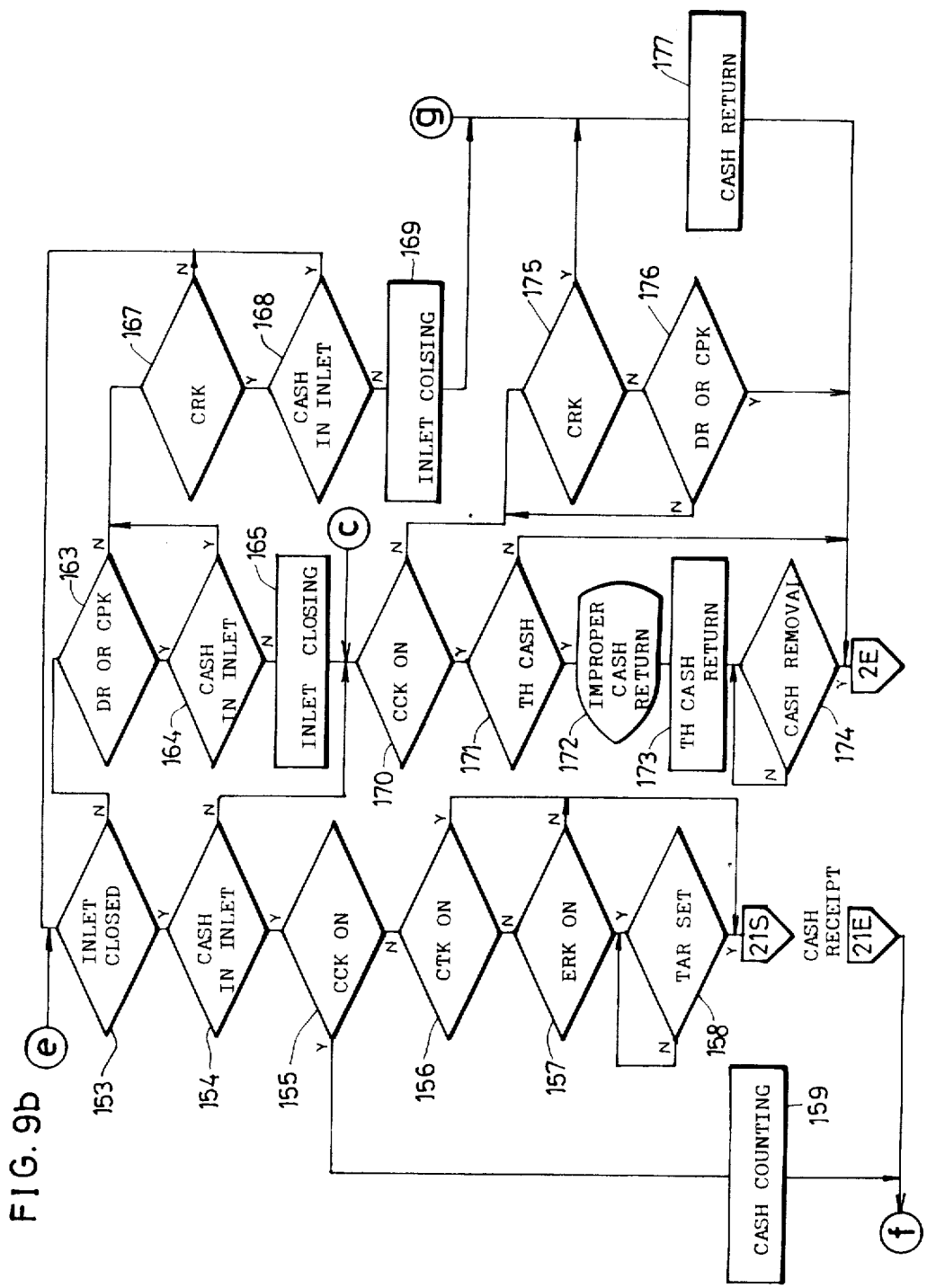

FIG. 9 shows the cash setting process in detail. With reference to this drawing, the TSR data is checked as to whether or not it is depositing (step 151). If YES, the shutter 41 for the inlet 7 of the bill receiving unit 21 is opened (step 152, the same is true of the coin receiving unit 23) for the placement of cash. The $100 handed over by the customer is placed into the inlet 7 by the teller, and the shutter 41 is then closed manually (step 153, YES). Step 154 is also YES.

Next, the cash counting key (CCK) and CTK are checked for depression (steps 155, 156). Since these steps are NO, the ERK is checked as to whether or not the key has been depressed (step 157). With the key not in the depressed state, step 158 is skipped to conduct cash receiving processing.

Figure 10:
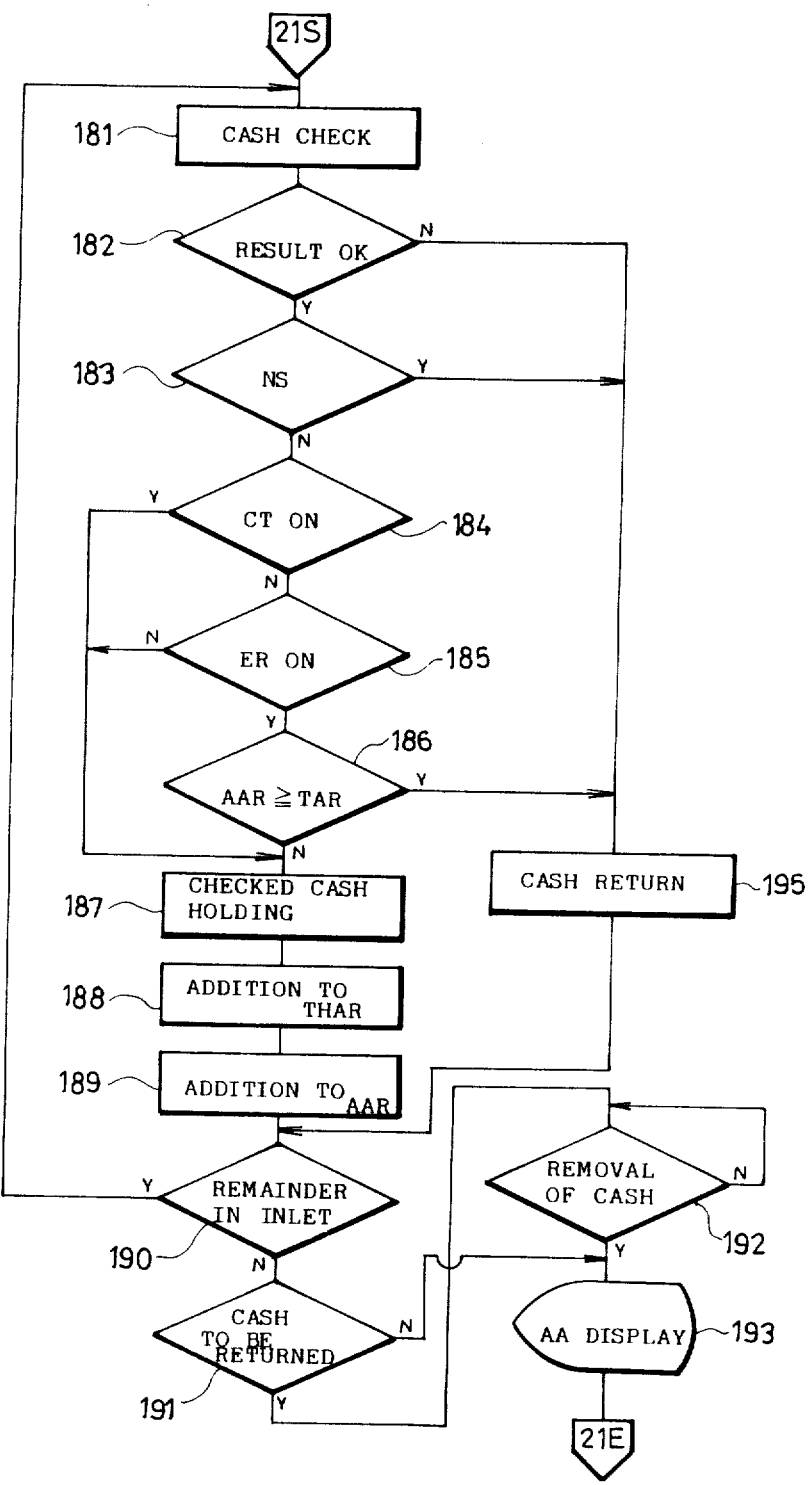
FIG. 10 is a flow chart showing a cash receiving process.

With reference to FIG. 10, the bills placed into the inlet 7 are taken in one by one and checked by the checker 32 (step 181). When the bills are found to be genuine (YES for step 182), step 183 checks whether or not the number of bills retained by the holder 33 has reached the maximum NS with reference to the count on the THC. When the number is less than NS, the CTK and ERK are checked for their positions (steps 184, 185). Neither of the keys is depressed, so that step 184 is NO, and step 185 is NO. Step 186 is skipped. The checked bills are temporarily held by the holder 33, with +1 given to the THC (step 187). The sum of the bills is added to the THAR and AAR (steps 188, 189). The inlet 7 is cheched as to whether bills are still remaining therein (step 190). The bills, if remaining in the inlet 7, are checked one by one in step 181 repeated and are temporarily held. The sum of these bills is added to the THAR and the AAR. When steps 181 to 190 are repeated 50 times, the number of bills temporarily held reaches NS, whereupon step 183 changes to YES. The 51st bill and the following are returned to the return outlet 8 through the second return path 36 (step 195). The bills which are not discriminated as being genuine by the checker 32 are also returned (steps 182, 195). After the inlet 7 becomes empty (NO for step 190) and after the returned bills, if any, are removed from the return outlet 8 (steps 191, 192), the AAR data is displayed in the sixth line on the CRT 3 (step 193). In the present example, the bills placed into the inlet 7 are in the sum of $100. When these bills are genuine, the data of THAR, as well as of AAR, is $100, which is displayed in the sixth line as the accepted amount.

The teller depresses the change key (CHK) (FIG. 8, step 137). Since the TSR data is depositing (step 138), with the TA of $1100 already keyed in (step 139), the change is calculated (step 140). In the present case, the AA is $100, PB is $1010 and TA is $1100. Accordingly the change is AA plus PB minus TA ($100+$1010−$1100=$10). The change of $10 is set in the CHR. The amount of change (CHA) is shown in the eighth line on the CRT 3 (step 141).

The teller depresses the completion (CP) key (step 148). This means that the data keying-in and slip, bank book and cash setting procedures are completed.

Since the transaction setting is depositing, the step 112 in FIG. 7 is YES. Step 122 checks whether or not the payment balance is negative.

$$\text{Amount of money } (A) = PB + \text{accepted amount } (AA) - \\ (\$10) \quad\quad (\$1010) \quad\quad\quad\quad (\$100) \\ \text{transaction amount } (TA) \\ (\$1100)$$

Thus the amount register (AR) data is positive, so that step 123 is YES, followed by zero proof check (step 114).

$$A = AA + PB - TA - CH \\ (0) \ (\$100) \ (\$1010) \ (\$1100)(\$10)$$

Accordingly the AR data is 0, and step 115 is YES, to be followed by communication with the center. If the teller does not depress the CHK and the change is not calculated (step 140), the zero proof check indicates an error.

When the transaction is allowed by the center through communication therewith (step 117), totaling for each transaction is conducted by the RAM 15 (step 118), followed by processes for printing the slip and bank book and paying cash.

Since the TSR data is depositing, step 200 in FIG. 11 is YES. The AAR data ($100) is added to the PBR data ($1010), and the TAR data ($1100) is subtracted therefrom, giving a new payment balance which is stored in the PBR (step 203). The new balance is equivalent to the change. The THAR data ($100) is added to the data in the receipt totaling R (RTR) in step 204. The AAR, TAR and THAR are cleared (step 205). If bills are held by the holder 33 (step 206), the bills are placed into the container 34 (step 207). The PBR data is not 0 (step 221), and the CTK is reset (step 222, NO), so that the process proceeds to step 223 in which for the preparation of cash dispensing procedure, the PBR data is transferred to the WAR. The PBR is cleared (step 224). Step 225 transfers the WAR data to the DAR for a cash dispensing process. After this process, the TAR and DAR are cleared (step 226).

Figure 12:
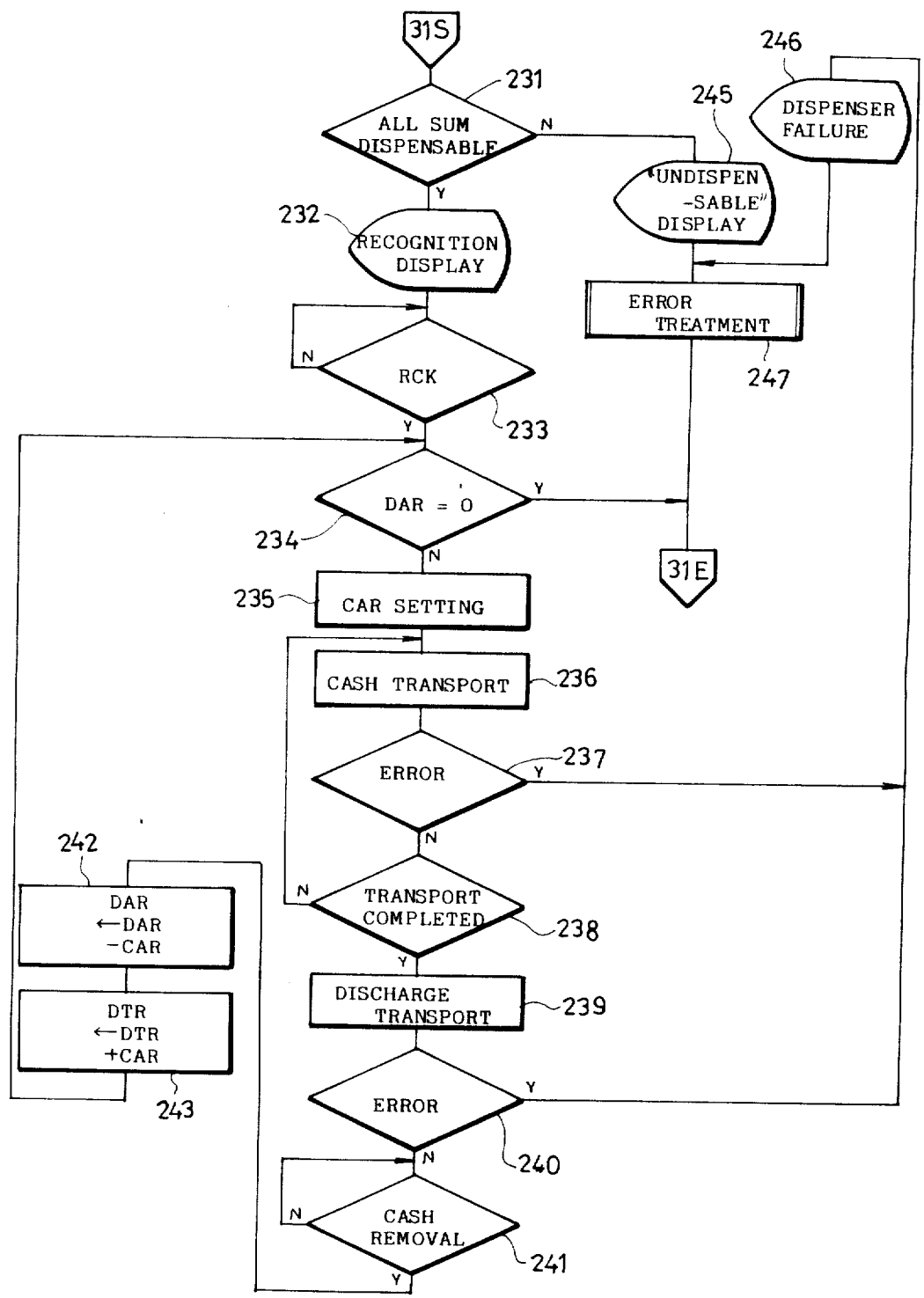
FIG. 12 is a flow chart showing a cash dispensing process.

FIG. 12 shows the cash dispensing process in detail. First, step 231 checks whether or not the whole amount of cash stored in the DAR can be dispensed. More specifically the cash dispenser 22 is checked for a sufficient supply of bills or for possible trouble based on the data stored in RAM 15. In the event of trouble developing in the dispenser 22, the DAR is checked as to whether or not its data is 0. When the whole amount of cash can be dispensed, a message is given in the 12th line on the CRT 3 intructing the teller to recognize dispensing (step 232). The RC key is depressed (step 233). Unless the DAR data is 0, the amount of money to be dispensed is set in the CAR by the dispenser 22 (step 235). The maximum amount of bills that can be held by the holder 66 of the cash dispenser 22 is, for example, 50 bills. If the amount of the money to be dispensed (DA) is in excess of 50 bills, the cash is dispensed dividedly at least two times. For first dispensing, the maximum that can be dispensed at a time is set in the CAR.

With the DA set in the CAR, bills are sent out from one of the containers 61 to 64 one by one for transport and are temporarily held in the holder 66, and the transported bills are counted up (step 236). Step 237 checks the transport means for the possible error interrupting continued transport, for example, for idle transport or jamming. When the dispenser is free of any error, whether or not the amount of money set in the CAR has been completely transported is checked. If this has not been completed, step 236 follows again to repeat the operation (step 238). In the event of idle transport or a jam, the bill transport operation is repeated a specified number of times (e.g. three times). If idle transport still occurs or the jam remains unremedied, step 237 gives a judgment of error.

On completion of the transport of the counted amount of bills, the bills held by the holder 66 are further transported through the discharge path 67 to the outlet 9 (step 239), and the shutter 74 is opened. Step 240 checks the transport means for the possible jam or like error in the course of the discharge transport. If no discharge transport error is detected, the bills are removed from the outlet 9 by the teller (step 241).

Upon the removal of the bills, the CAR data is subtracted from the DAR data. The result is a new amount of dispensing (step 242). This procedure is useful when the dispensing amount is in excess of the maximum that can be dispensed at a time. Next, the CAR data is added to the DTR for totaling (step 243). The process returns to step 234. When the DAR data is found to be 0 in step 234, this means that the amount of money to be dispensed has been completely dispensed. If otherwise, the amount of money to be dispensed second time is set in the CAR, and bills are dispensed similarly.

When it is found in step 231 impossible to dispense the whole amount specified due to the absence of bills in the containers 61 to 64 or a trouble in the dispenser while the DAR data is not 0, and also when step 237 or 240 detects an error, the CRT 3, line 12 gives a message to the effect that bills are not dispensable or a trouble developed in the dispenser (step 245 or 246), followed by the treatment of error (step 247). Since the dispenser 22 is unable to dispense cash in such a case, the teller will pay the money.

In the present case, the DAR data is $10, $10 is set in the CAR (step 235), and a $10 bill is sent out from the container to the outlet 9 (steps 236 to 239). Step 242 changes the DAR data to 0, while step 243 adds $10 to the DTR.

The teller removes the $10 cash from the outlet and hands the money and the three bank books bearing the transaction data printed thereon to the customer. The printed slips are filed. Thus the combined transaction service is completed.

With reference to FIG. 7 again, the depositing process (step 112, YES) performs before communication with the center the same operation as in the payment balance calculation (FIG. 11, step 203) as illustrated as step 122, and the payment balance is checked as to whether or not it is nenative (step 123). Since the payment balance is the amount eventually payable to the customer, it is impossible to conduct communication with the center and execute the transaction if the balance is negative. Steps 122 and 123 serve to eliminate such objection. When the balance is negative (NO for step 123), step 120 follows to give an error message in the 12th line on the CRT 3 to the effect that the payment balance is negative. With reference to the display, the teller depresses the RC key (step 121), whereupon the process returns to step 106. Accordingly the teller can cancel the transaction with the DR key or to key in a transaction amount (depositing amount) or set cash again. In the case of transactions other than depositing transactions, e.g. in dispensing transaction, the amount of transaction (dispensing amount) is added to the payment balance (FIG. 11, step 210), so that the steps 122 and 123 are not always needed. However, irrespective of the kind of transaction, these steps may be executed.

The combined transaction service described above includes three transactions, i.e. withdrawal of $900 from an ordinary deposit, cancellation of time deposit and depositing of $1100 in a current account. With this service, the teller depresses the CTK to set CTK flag to start the first transaction of withdrawing $900. Accordingly in the first transaction of withdrawing and the second transaction of cancellation, the step 222 of the cash paying process (FIG. 11) is YES, with the result that no cash is dispensed. Further when starting the last transaction of depositing $1100, the teller depresses the CTK again to reset the CTK flag. Consequently step 222 in the last transaction process is NO and is followed by a cash dispensing process, whereby the amount of change stored in the PBR is released to the outlet of the cash dispenser 22.

The teller may inadvertently forget to redepress the CTK when starting the last transaction of depositing. In this case, the CTK flag remains in the set state. Step 222 is then YES, and the cash corresponding to the payment balance will not be dispensed. According to the present invention, the cash of payment balance can be dispensed even if the teller forgets to cancel the combined transaction service.

In the above case, i.e. when the last transaction is completed without dispensing the cash equivalent to the payment balance due to a failure of the teller, the teller depresses the CTK (FIG. 7, step 107) to cancel the combined service (YES for step 108) in step 110. Upon completion of the last transaction of the service, the process of FIG. 7 returns to the starting step 100 and proceeds to the step 101, with the transaction code 00000 set in the TSWR. After cancelling the service, the teller depresses the DRK (step 102), whereupon the TSWR data is transferred to the TSR (step 105), followed by the display of transaction guidance in step 106 (with nothing shown since no transaction is set) and thereafter by data keying-in and slip, bank book and cash setting.

The teller performs nothing for these setting procedures but depresses the completion (CP) key only for data input (FIG. 8, step 148) and thereby proceeds to step 111, which is NO. This is followed by step 112. Since the TSR data is 00000, step 112 is NO. With the CTK already off, step 113 is likewise NO. The AAR data has already been cleared in step 205 of FIG. 11 and is 0, so that step 119 is YES. Communication with the center follows (step 116).

Since nothing is set in the system as to transaction data inlcuding the kind thereof, the cable message to be sent to the center bears only a minimum of data as required by the format (e.g. terminal number of the system), and the message is sent to the center. In response to the message, the center serves a message stating only that the transaction is allowable. Step 117 is therefore YES, and the frequency of transactions only is totaled (step 118). The process proceeds to slip and bank book printing and cash payment procedures. Since no transaction data is contained in the message from the center, no printing operation is conducted.

In the cash payment process (FIG. 11), steps 200 and 201 are both NO, and the TSR data is 00000. Step 202 is therefore YES. Consequently step 221 follows. The PBR contains the balance remaining therein undispensed, so that step 221 is NO. Because the CTK is already off, step 222 is NO. By way of steps 223 to 225, the process proceeds for dispensing cash, and cash in the sum of the data in the PBR is dispensed.

In the above cash wherein the cash of the payment balance is dispensed after the completion of combined service in the event of teller's failure, communication with the center is conducted without transaction data. However, the communication can be omitted. It is noted that the teller releases the CTK and depresses the CP key to dispense cash. It is possible to provide a special key in place of the CP key for forcibly dispensing cash, such that the depression of the key is followed immediately by the step 221 of FIG. 11.

With reference to FIG. 9, steps 161, 163 and 176 are provided for timing the data keying-in process (FIG. 8) with the cash setting process. As already stated, the DR key is used for redoing the keying-in procedure (step 144). The CP key is depressed upon completion of the keying-in procedure. (At this time, the book, slip and cash setting procedures are also completed.) (See step 148.) The depression of these keys is stored in the RAM 15 as flags. When step 161 is YES and step 154 NO, the process proceeds to step 170. If step 163 is YES, the inlet 7 is checked for the presence of bills (step 164). In the absence of bills, the shutter 41 for the inlet 7 is automatically closed (step 165), followed by step 170. If the CCK is found to be off by this step 170, the CRK is checked in step 175. When it is off, step 176 follows. If the DRK or CP key is found to be on, the cash setting process is completed.

The cash return key (CRK) is depressed when it is required to return the bills held by the holder 33. When steps 162, 175 are YES, the process proceeds to step 177. When step 167 is YES, the inlet 7 is checked for the presence of bills (step 168). In the absence of bills, the shutter 41 for the inlet 7 is closed (step 169). Step 177 is executed.

In the cash return process (step 177), the holder 33 is checked for the presence of bills thereby held based on the output signal from the bill detector 51. When bills are present, a message is given in the 12th line on the CRT 3 to the effect that the cash will be returned. The held bills are transported to the return outlet 8 by way of the first path of return 35. Upon the removal of the cash from the outlet 8, the THAR data is subtracted from the AAR data, and the THAR data is cleared.

When the CCK is on, step 155 is YES, followed by cash counting step 159. In this process, the bills placed into the inlet 7 are taken in one by one and checked by the checker 32. The bill which is genuine is returned to the return outlet 8 through the second path of return 36. The bill checking and returning operation is repeated until the inlet 7 is emptied of bills. The bill which is not discriminated as being genuine by the checker 32 is held by the holder 33. After all the bills in the inlet 7 have been checked, the shutter 42 for the return outlet 8 is opened. When the cash is removed by the teller, the total of the checked cash is displayed on the CRT 3 in the 12th line.

With the checking and counting process thus completed, step 152 follows. When the open shutter 41 is closed again by the teller (step 153), step 154 and then step 170 are executed since no cash is present in the inlet 7. With the CCK already depressed, step 170 is YES. If improper bill or bills are held by the holder 33 (YES for step 171), the CRT 3 gives a message to the effect that the improper cash will be returned (step 172). The money temporarily held is returned to the return outlet 8 by way of the first return path 35, and the shutter 42 is opened (step 173). The teller removes the returned bills (step 174), whereby the process of FIG. 9 is completed.

When the CTK is off (step 156, NO) with the ERK on (YES for step 157) in a depositing transaction, the system waits for the entry of a transaction amount (depositing amount) (step 158) because excess rejection has a meaning when some transaction amount is determined.

When the CTK is off (step 184, NO) with the ERK on (YES for step 185) in the cash receiving process of FIG. 10, the process proceeds to step 186 in which the AAR data and the TAR data are compared every time a bill is taken in and checked. After the AAR value has reached the TAR value, the following bills are returned to the return outlet 8 by way of the second return path 36 without being temporarily held (step 195). Accordingly when $1000 (ten $100 bills) is placed into the inlet 7 by an error although the amount of transaction is $850, $900 only is held by the holder 33, and $100 is returned to the return outlet 8. $50 is change (step 140). Thus even when a number of bills in excess of the transaction amount are erroneously placed in, the excess of money is immediately returned when the ERK is on.

However, when the ERK is already on with the CTK also on, step 156 of FIG. 9 is YES. Steps 157, 158 are skipped, and the cash receiving process is executed. Further in the cash receiving process (FIG. 10), step 184 is YES to skip steps 185 and 186 and cancel the excess rejection function. It therefore follows that in the combined transaction service processing, the cash placed in is all accepted, the dispensing amount (change) is calculated for each transaction as a payment balance, and the eventual payment balance is dispensed at the last stage of the service processing. Accordingly the ERK can be held depressed at all times for usual transactions. For combined service, the CTK needs only be depressed but there is no need to cancel the excess rejection function by redepressing the ERK.

Figure 13:
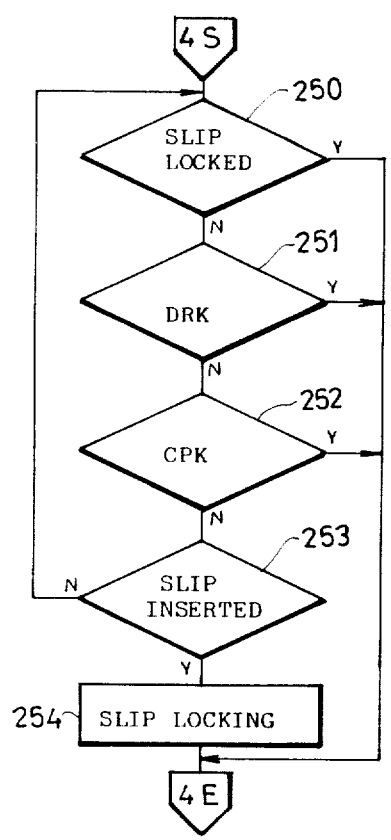
FIG. 13 is a flow chart showing a slip setting process.

FIG. 13 shows the slip setting process. When the depositing slip is inserted into the slip inlet 6 in step 253, the slip is locked (step 254). The process is completed as it is when the slip is already locked (step 250), when the DRK is depressed for repetition (step 251) or when the CP key is depressed without inserting any slip in a transaction (e.g. reference) wherein no slip is used (step 252).

Figure 14:
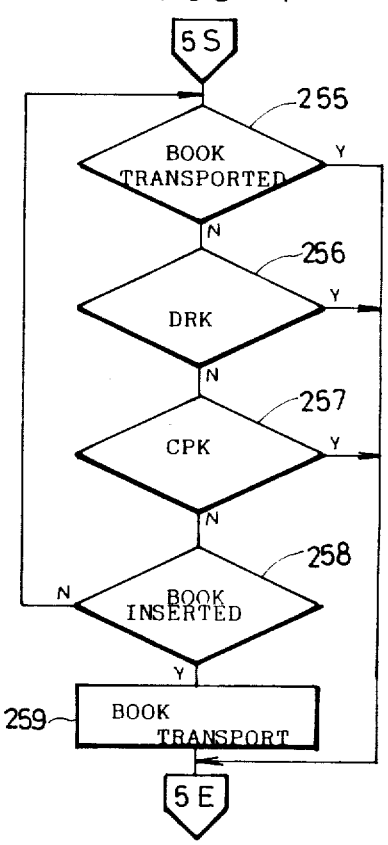
FIG. 14 is a flow chart showing a bank note setting process.

FIG. 14 shows the bank book setting process. When the bank book is inserted into the bank book inlet 5 (step 258), the bank book is transported into the interior of the system (step 259). The process is completed as it is when the book has already been transported (step 255), when the DRK is depressed (step 256) or when the CP key is depressed without placing in any book for a transaction wherein no book is used (step 257).

Figure 15:
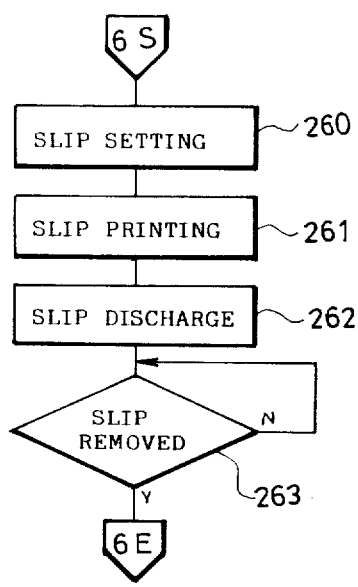
FIG. 15 is a flow chart showing a slip printing process.

FIG. 15 shows the slip printing process. The slip locked in step 254 is brought to position with the line to be printed on opposed to the printing head of the printer 25 (step 260), and a certification (such as the date of transaction or account number) is printed on the slip (step 261). The slip is thereafter discharged to the inlet 6 (step 262). The process is completed upon removal of the slip (step 263).

Figure 16:
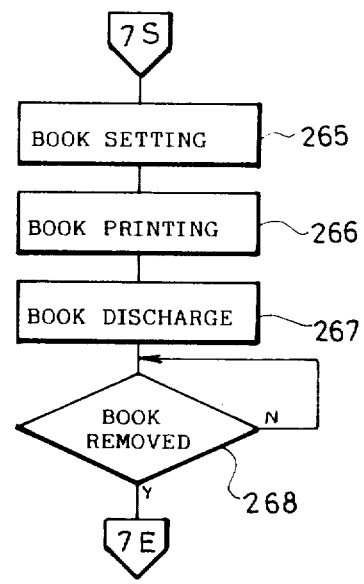
FIG. 16 is a flow chart showing a bank note printing process.
Figure 17A:
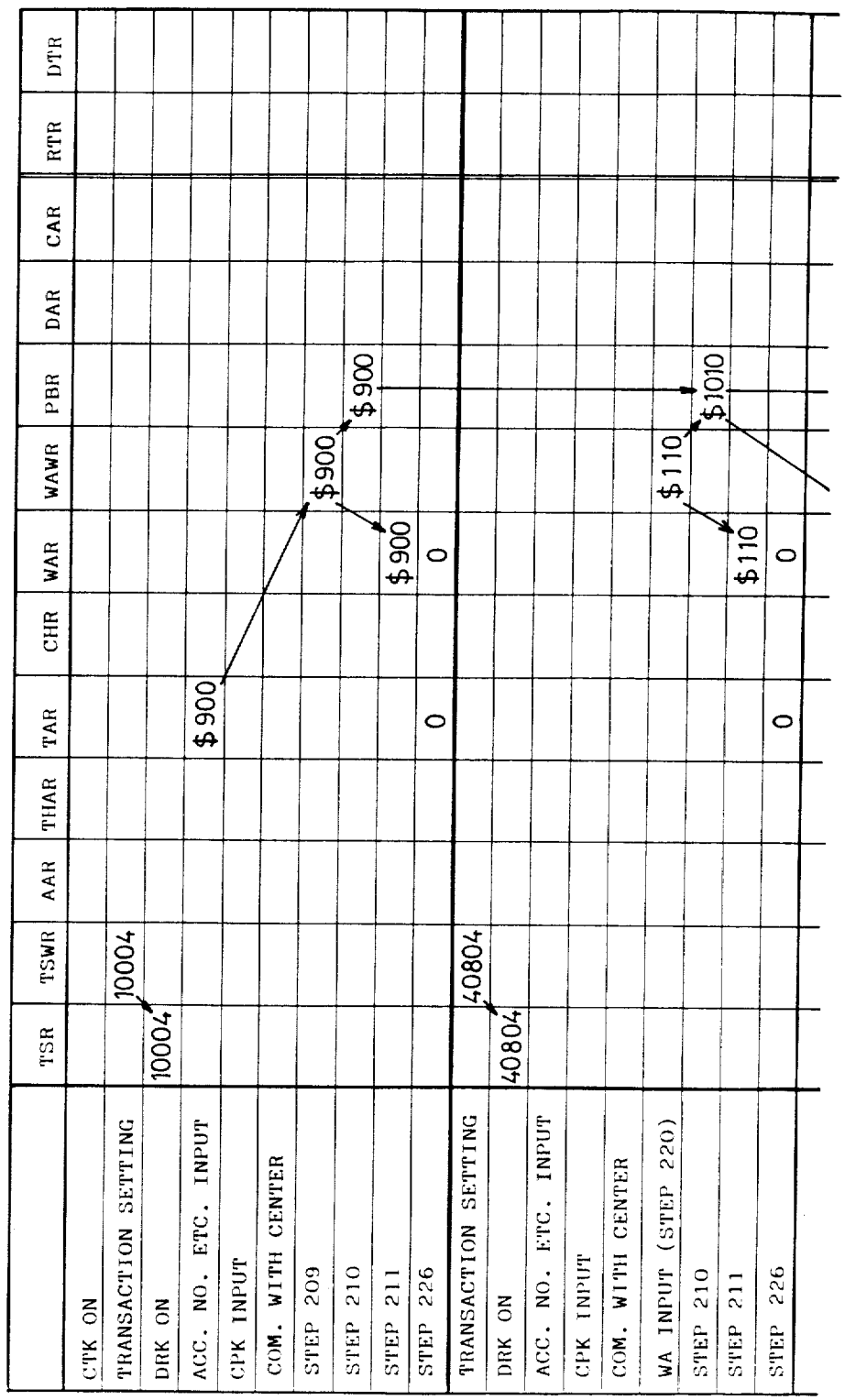
FIGS. 17a and 17b show a manipulating procedure and data in registers.
Figure 17B:
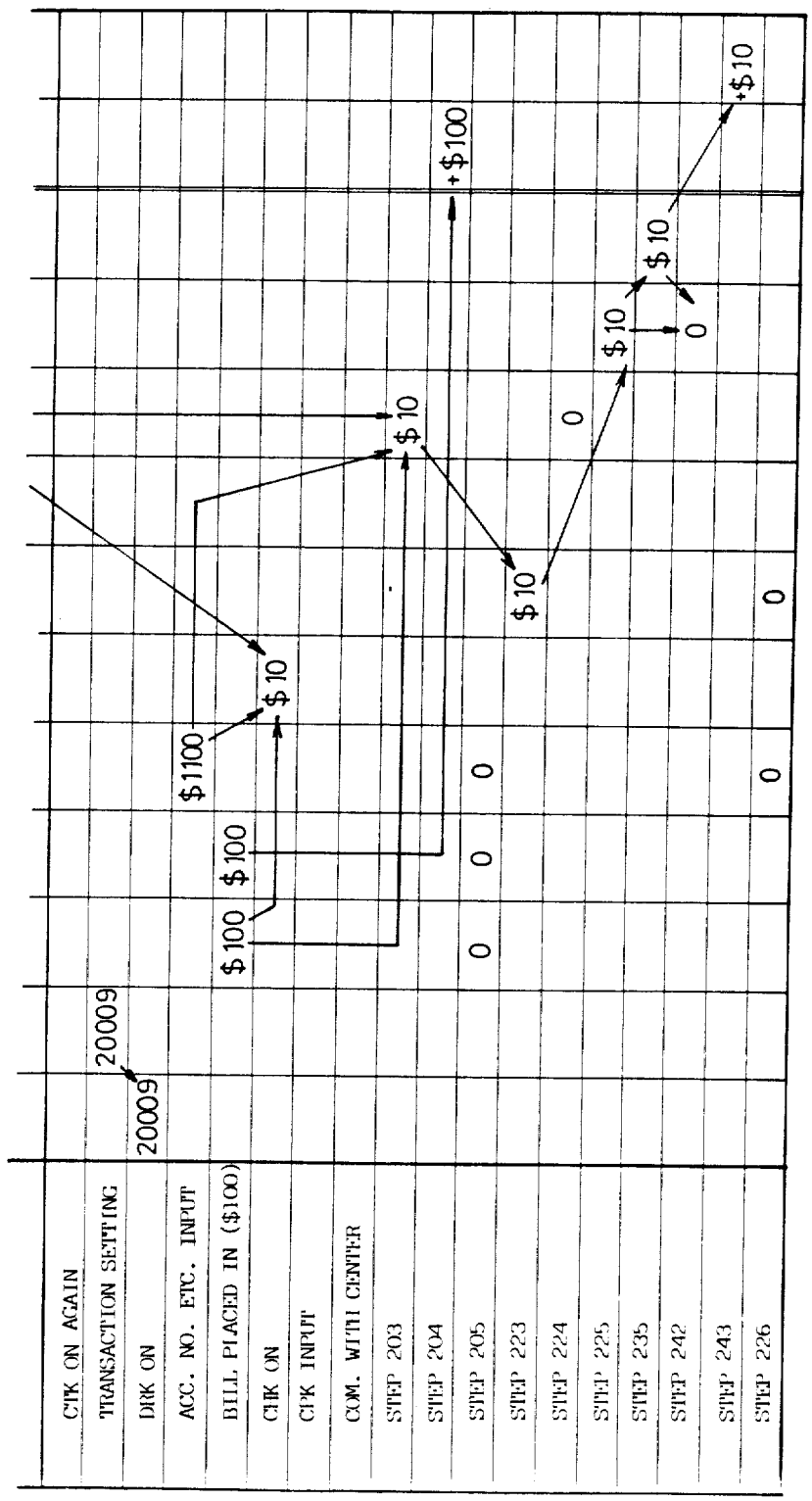

FIG. 16 shows the printing process for the bank book. The bank book transported in step 259 has the proper line thereof set in position (step 265), and the transaction data is printed on the book (step 266). The book is thereafter discharged to the inlet 5 (step 267). When the bank book is removed, the process is completed (step 268).

Although processes for bills only have been described above, the processes for coins and processes wherein both bills and coins are used are executed in exactly the same manner as above.

Figure 19:
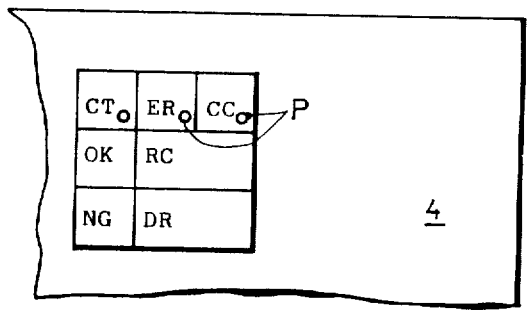
FIG. 19 shows a modified keyboard.
Figure 20:
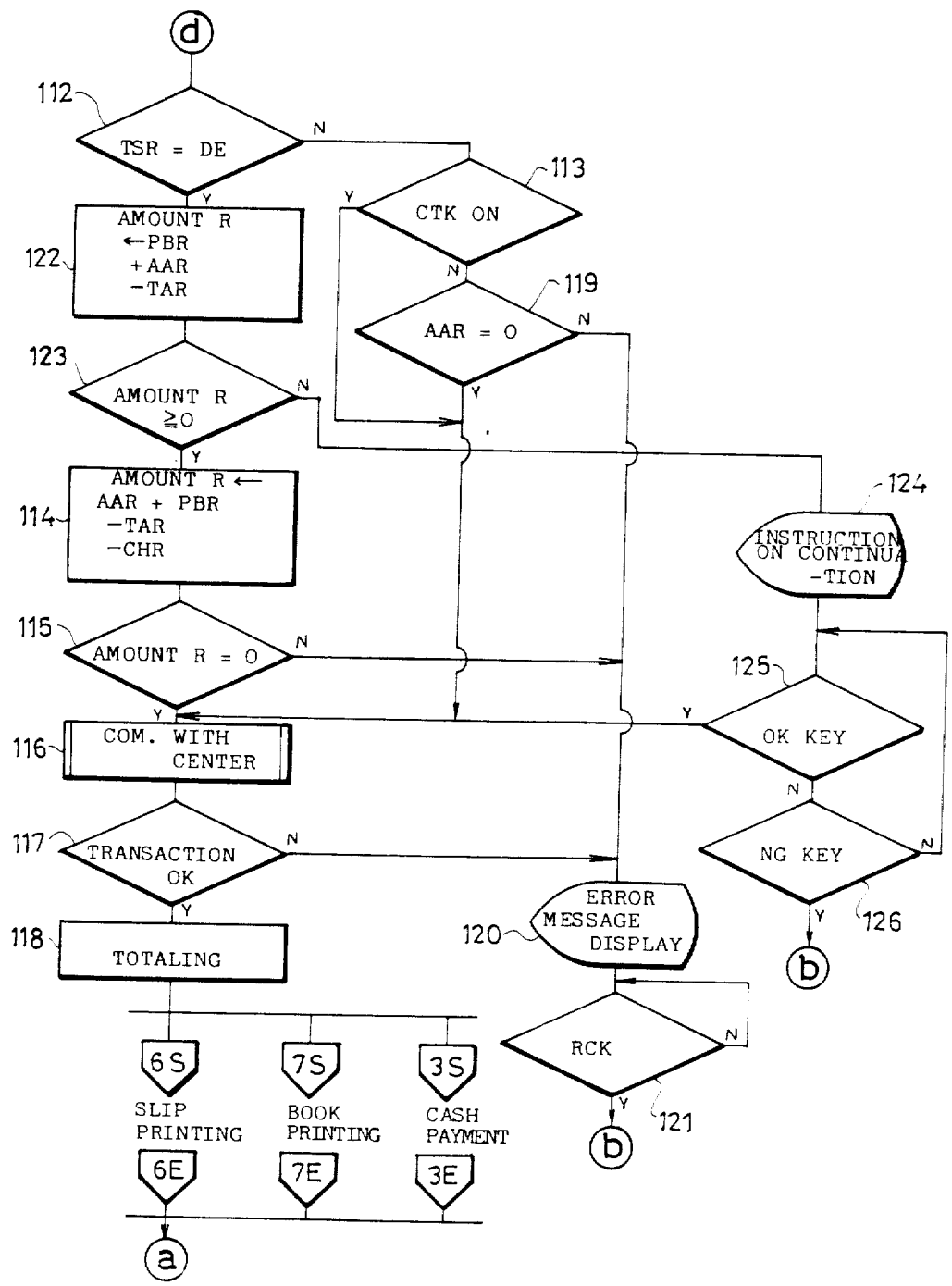
FIGS. 20 and 21 show a flow chart illustrating other measures to be taken when the payment balance becomes negative.

FIGS. 19 and 20 show other exemplary measures useful when the payment balance is negative. With reference to FIG. 20, when the payment balance is found negative (NO for step 123), step 124 is executed in which instructions are given on the CRT 3 in the 12th line, requesting a judgment as to whether or not the transaction is to be continued because the payment balance is negative. It is desirable to show the deficit on the CRT 3.

FIG. 19 shows a keyboard 4 having transaction continuing keys including an OK key for entering continuance of transaction and an NG key for entering discontinuance of transaction. When the judgment as to the continuance of the transaction is requested on the display, the tellers selects either one of the OK key and the NG key for depression. When the OK key is depressed (YES for step 125), the system immediately communicates with the center without conducting any zero proof check. The zero proof check is not conducted because if the payment balance is negative, step 115 is invariably NO. When the NG key is depressed (step 126), step 106 follows.

Except the cash placed into the bill receiving unit 21, the teller himself may have cash received and contained in his cash container and will judge that the balance of payment will not become negative if the cash is added. Alternatively the service concerned may include a withdrawing transaction which has not been executed, and the teller will be sure that the payment balance is not negative eventually if the withdrawing transaction is executed. In such a case, the depositing transaction can be continued by depressing the OK key. When the NG key is depressed, the teller can cancel the transaction by the DR key, key in an altered amount of transaction (depositing), or set cash again.

Figure 21:
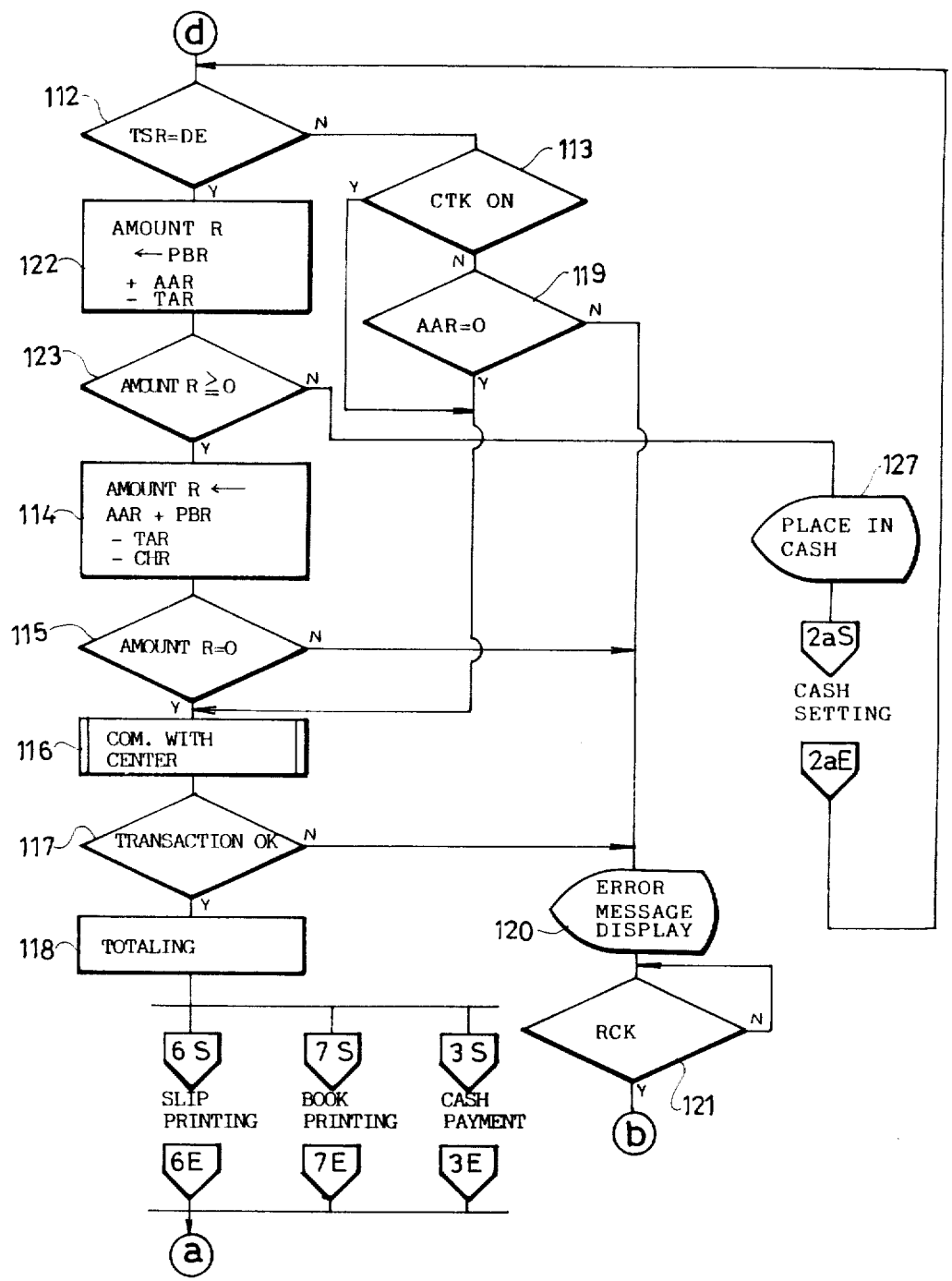
Figure 22:
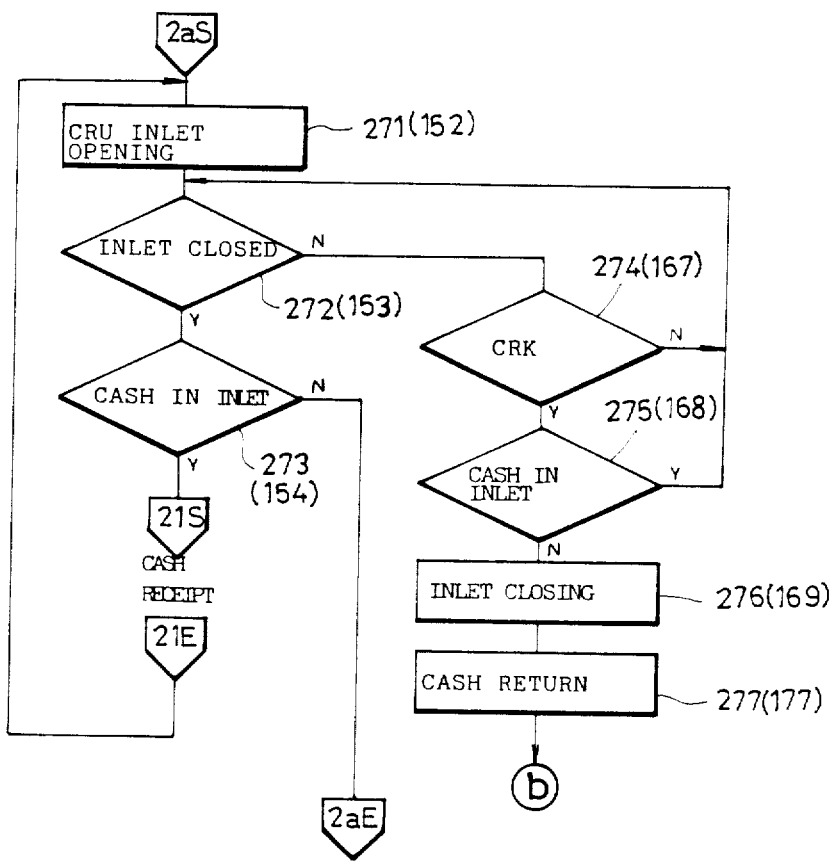
FIG. 22 is a flow chart showing a cash supplement setting process.

FIGS. 21 and 22 show other measures useful when the payment balance becomes negative. With reference to FIG. 21, when the balance is negative (NO for step 123), step 127 is executed in which a message is given on the CRT 3 in the 12th line, stating that a supplement of cash should be placed in to remedy the deficit. Preferably the deficit is shown on the CRT 3. A cash setting process is thereafter executed for meeting the deficit.

FIG. 22 shows the process, which is almost similar to the cash setting process shown in FIG. 9. Each step in FIG. 22 is referred to by the reference number, given in parentheses, of the corresponding step of FIG. 9. To place in a cash replenishment, the shutter 41 for the inlet 7 of the bill receiving unit 21 is opened (step 271). With reference to the display on the CRT 3, the teller receives from the customer cash in an amount equivalent to the deficit, places the cash into the inlet 7 and manually closes the shutter 41, or the customer himself places the cash replenishment into the inlet 7 and closes the shutter 41 (step 272, YES). Step 273 is therefore YES, followed by the cash receiving process of FIG. 10. On completion of the acceptance of the cash, step 271 is repeated to open the shutter 41 again. Usually the shutter 41 is immediately closed by the teller (YES for step 272). Now the inlet 7 is empty; (NO for step 273), and step 112 of FIG. 7 thereafter follows.

Step 112 is YES, so tht the payment balance is checked again (steps 122, 123). Since the cash replenishment is added to the AAR in the cash accepting process (FIG. 10, step 189), step 123 turns YES insofar as the replenishment is not less than the deficit. Communication with the center is conducted by way of a zero proof check.

After the instructions to meet the deficit are displayed (step 127), it is possible for the teller to depress the cash return key (YES for step 274) to return the cash already placed in (step 277). Upon the return of the cash, the process returns to the step 106 of FIG. 7. The teller can then cancel the transaction by depressing the DR key, or key in an altered amount of transaction (for depositing).

The shutter 41 of the inlet 7 of the bill receiving unit 21 is usually closed (as is the case with the coin receiving unit 23). It is opened only for depositing transactions (steps 151, 152 in FIG. 9) because if it is open also for transactions other than depositing, for example, for withdrawing transactions, there is the likelihood that cash will be placed in by an arror, giving rise to confusion. The shutter 41 for the inlet 7 is opened also after the replenishing instructions are given in step 127 (step 271), permitting placement of the cash replenishment for the continuance of the depositing transaction as above even when the payment balance becomes negative. In the case of combined transaction services, the shutter 41 of the inlet 7 may be held open or made manually openable at all times as will be described below.

Figure 23:
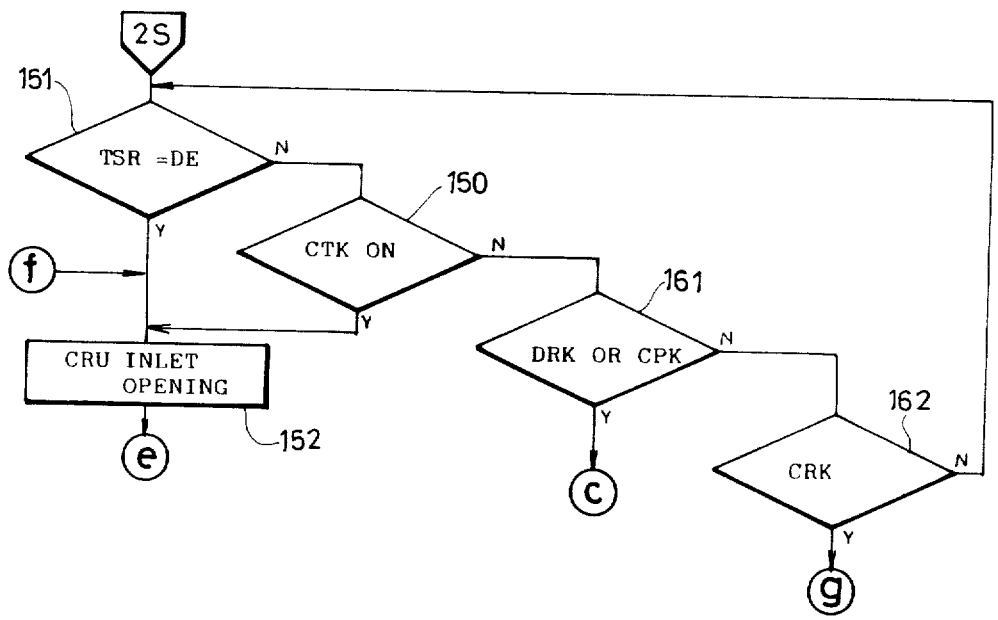
FIG. 23 is a flow chart showing another example of cash setting process.

FIG. 23 shows another example, in which checking step 150 is incorporated into the cash setting process. In this process, step 151 first checks whether or not the transaction is depositing with reference to the TSR data, and then step 150 checks whether or not the CTK is already on. If the system is set for depositing or a combined transaction service, the shutter 41 for the inlet 7 of the bill receiving unit 21 is opened for the placement of cash. The shutter 41 is held closed at all times except when the system is set for depositing or a combined service to avoid the possible confusion that would be involved in processing for the reason given above.

In conducting a combined transaction service including both depositing and withdrawal, the withdrawing transaction is executed first generally, and after the amount of money to be withdrawn has been determined by the execution of this transaction, the depositing transaction is performed with use of the withdrawal (payment balance) and, when needed, with cash placed in. With the process shown in FIG. 9, the shutter for the cash inlet is opened only for dispensing transactions, whereas when there is cash to be placed into the cash receiving unit in this case, the cash can not be deposited before the depositing process which is the last half of the series of transactions. However, when the system is set for a combined service according to the present embodiment, the cash receiving unit is ready for accepting cash at any time (step 150), so that the cash to be deposited can be placed into the unit also in the first half of the service, i.e. during the withdrawing process. Since the teller or customer can set the cash at any time desired, there is no need to hold the cash until the last half of the service, hence very convenient. While the above embodiment is so adapted that the shutter is open when the CTK is on (step 152), the shutter may be locked in its closed position usually and unlocked when the CTK is on so as to be opened manually. Alternatively the cash transport means may then be brought in condition for driving.

What is claimed is:

1. A system for performing financial transactions comprising:
   a cash receiving unit comprising a cash inlet, means for receiving cash from said inlet, means for checking the received cash for genuineness, means for accepting cash which is genuine and means for storing accepted cash;
   a cash dispenser having a cash outlet for dispensing a specified amount of cash from the outlet;
   means for selecting a combination of depositing and-/or withdrawing transactions;
   keyboard means for manually entering numerical data representing the amounts of money involved in selected depositing and withdrawing transactions;
   means for setting the system into a combined transaction service mode and resetting the system out of the combined transaction mode;
   a display for displaying transaction information;
   processor means responsive to said cash receiving unit, keyboard means, selecting means and setting means, for controlling execution of said selected transactions and operation of said cash dispenser and display, and for determining and storing data representing the amount of cash accepted by said cash receiving unit; and
   payment balance memory means for storing the total amount of money to be dispensed at the end of the selected transactions;
   said processor means including calculation means for calculating the payment balance and storing the value thereof in said payment balance memory means when the system is set in for combined transaction service mode by adding to the amount stored in the payment balance memory means the amount of accepted cash stored by the cash receiving unit and the amount of money to be withdrawn for each withdrawing transaction and subtracting from the amount stored in the payment balance memory means the amount of money to be deposited for each depositing transaction, said processor means further including cash dispenser control means for preventing said cash dispenser from dispensing cash when the system is set for the combined transaction service mode and causing the dispenser to release cash in the sum of the stored payment balance when the system is reset out of the combined transaction service mode.

2. A system as defined in claim 1, wherein said processor means includes means for checking whether or not the payment balance is negative, at least when a depositing transaction is made, and wherein when the payment balance is negative, said checking means causes the display to display a message relating to the negative balance.

3. A system as defined in claim 1, wherein said processor means include means for checking whether or not the payment balance is negative, at least when a depositing transaction is made, and a cash receiving unit control means for conditioning said cash receiving unit to accept cash when the payment balance is negative.

4. A system as defined in claim 1, wherein said processor means includes cash receiving unit control means for conditioning said cash receiving unit to accept cash when the combined transaction service mode is set.

5. A system as defined in claim 1, wherein said processor means includes means for forcing the cash dispenser to release cash in the sum of the payment balance after the combined transaction service mode is reset.

6. A system as defined in claim 1, wherein said processor means further includes:
   means for storing the amount of each transaction entered by the keyboard means, and said system further comprises:
   a key for setting an excess rejection mode;
   said cash receiving unit having a cash return outlet, said processor means further including means for comparing an accepted amount of cash with the amount of a selected transaction every time cash is accepted, and means for controlling said cash receiving unit to return an excess of cash after the accepted amount has reached the amount of a selected transaction, when the excess rejection mode is set.

7. A system as defined in claim 6, wherein said processor means includes means for cancelling an excess rejection when the combined transaction service mode is set.

8. A system as defined in claim 1, further comprising:
   a key for setting a cash counting mode;
   the cash receiving unit further comprising a cash return outlet, and means for temporarily holding the cash after it is checked for genuineness, said processor means including cash totaling means responsive to the setting of each cash counting mode for counting the amount of the cash checked as being proper by the checking means and means for operating said cash receiving unit to return to the return outlet cash checked as proper and to hold by the holding means cash checked as not proper;
   said processor means including means causing the display to display the amount of cash counted by the cash totaling means.

9. A system as defined in claim 1, wherein said processor means includes means for preventing release of cash from said dispenser when the payment balance is negative, said system further comprising a transaction continuing key for conditioning said processor means to permit release of cash even when said payment balance is negative.

10. A system for performing transactions comprising:
a cash receiving unit having a cash inlet, a cash return outlet, and means for checking the cash placed in said inlet for genuineness and for accepting cash which is genuine;
means for entering the amount of each transaction;
a key for setting an excess rejection mode;
processor means responsive to said cash receiving unit and said entering means, for storing entered transaction amounts and the amount of cash which as accepted as genuine, said processor means being responsive to said key for setting an excess rejection mode and including means for comparing the accepted amount of cash with the amount of a selected transaction every time cash is accepted, and operating said cash receiving unit to return an excess of cash through said return outlet after the accepted amount has reached the amount of the transaction, when the excess rejection mode is set.

11. A method for performing financial transactions in a system comprising the steps of:
receiving deposited cash in a cash receiving unit having a cash inlet for receiving the cash;
checking the received cash for genuineness;
accepting cash which is genuine and storing accepted cash;
determining and storing the amount of cash accepted;
selecting a combination of depositing and/or withdrawing transactions;
receiving manually entering keyboard numerical data representing amounts of money for selected depositing and withdrawing transactions;
performing one of setting the system into a combined transaction service mode and resetting the system out of the combined transaction service mode;
storing in a payment balance memory the total amount of money to be dispensed at the end of the selected transactions;
calculating the payment balance stored in said memory when the system is set in the combined transaction service mode by adding to the amount stored in the memory the amount of cash stored by the cash receiving unit and the amount of money to be withdrawn for each withdrawing transaction and subtracting from the amount stored in the memory the amount of money to be deposited for each depositing transaction; and
preventing a cash dispenser from dispensing cash when the system is set for the combined transaction service mode and causing the dispenser to release cash in the sum of the stored payment balance when the system is reset out of the combined transaction service mode.

12. A method for performing transactions comprising the steps of:
depositing cash in a cash receiving unit having a cash inlet and a cash return outlet;
checking the cash placed therein and accepting cash which is genuine;
storing the amount of cash accepted by the cash receiving unit;
receiving entered amounts of each transaction;
storing the entered transaction amounts;
setting an excess rejection mode; and
comparing the accepted amount of cash with the amount of a selected transaction every time cash is accepted and returning an excess of cash after the accepted amount of cash has reached the amount of the transaction when the excess rejection mode is set.

* * * * *